United States Patent [19]
Itoh et al.

[11] Patent Number: 5,506,786
[45] Date of Patent: Apr. 9, 1996

[54] CUTTING APPARATUS

[75] Inventors: Masao Itoh; Masataka Inagi; Sunao Kawada; Toyotsugu Itoh; Takayoshi Hashimoto, all of Hachioji, Japan

[73] Assignee: Konica Corporation, Japan

[21] Appl. No.: 285,871

[22] Filed: Aug. 4, 1994

Related U.S. Application Data

[63] Continuation of Ser. No. 430,286, Aug. 14, 1992, abandoned.

[30] Foreign Application Priority Data

Aug. 26, 1991 [JP] Japan .................................. 3-213679
Sep. 24, 1991 [JP] Japan .............................. 3-076552 U
Sep. 24, 1991 [JP] Japan .................................. 3-243383
Sep. 24, 1991 [JP] Japan .................................. 3-243384

[51] Int. Cl.$^6$ .................................................. G06F 17/18
[52] U.S. Cl. .................... 364/474.17; 340/683; 364/508; 364/507; 73/660
[58] Field of Search ...................... 364/474.17, 474.15, 364/474.16, 507, 508, 550, 551.01; 73/104, 660; 318/565, 569; 409/80; 340/679, 683, 825.23

[56] References Cited

U.S. PATENT DOCUMENTS

| | | | |
|---|---|---|---|
| 3,819,916 | 6/1974 | Watanabe | 235/151.11 |
| 4,713,770 | 12/1987 | Hayes et al. | 364/474.17 |
| 4,748,554 | 5/1988 | Gebauer et al. | 364/474.17 |
| 4,931,949 | 6/1990 | Hernandez et al. | 364/474.17 X |
| 5,115,403 | 5/1992 | Yoneda et al. | 364/474.15 |
| 5,159,836 | 11/1992 | Waschkies et al. | 73/587 |
| 5,251,151 | 10/1993 | Demjanenko et al. | 364/508 X |

Primary Examiner—Roy N. Envall, Jr.
Assistant Examiner—Brian C. Oakes
Attorney, Agent, or Firm—Jordan B. Bierman; Bierman and Muserlian

[57] ABSTRACT

A cutting apparatus for finishing a surface of a substrate of a photoreceptor drum of an image forming apparatus estimates a finish state of the surface on real time with the finishing. The cutting apparatus has a detector to detect a cutting force to a cutting tool from the surface in finishing, a memory to store a cutting force pattern to distinguish the finish state of the surface, comparator means to compare the detected cutting force with the stored cutting force pattern and judging means to judge the finish state of the surface along with the progress of the cutting process.

18 Claims, 17 Drawing Sheets

FIG. 2-a
PERFECT MIRROR SURFACE
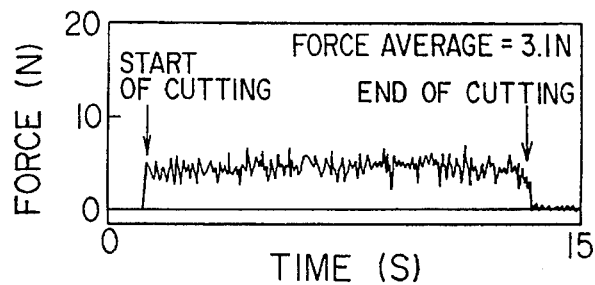
FIG. 2-b
ROUGH SURFACE CAUSED BY VIBRATION
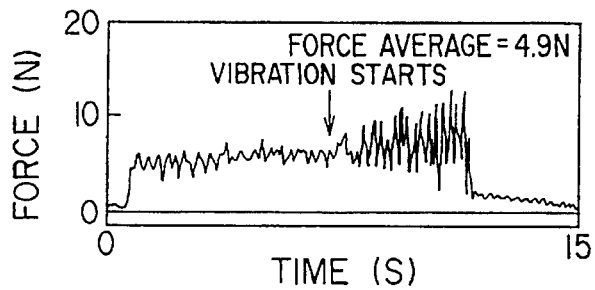
FIG. 2-c
ROUGH SURFACE WITH SCRATCHES
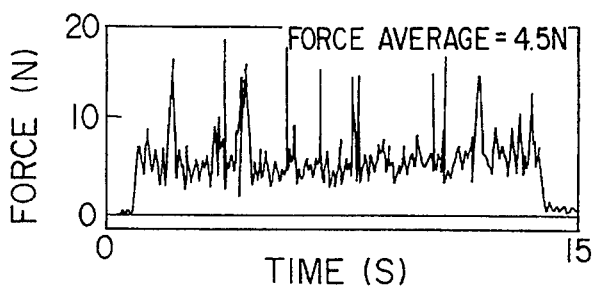
FIG. 2-d
RUBBED SURFACE BY CUTTING CHIPS
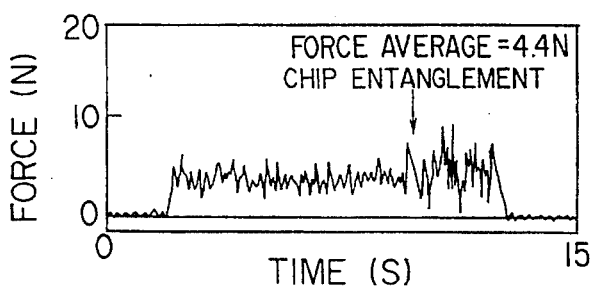
FIG. 2-e
SURFACE WITH UNCUT PORTION
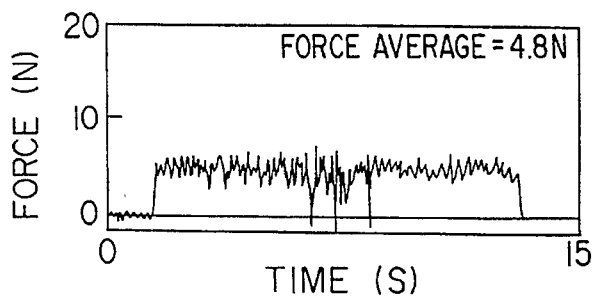

FIG. 4-a
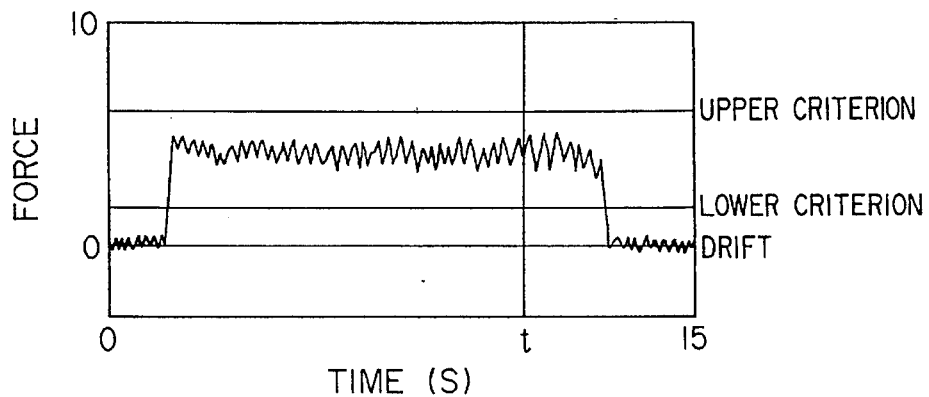
FIG. 4-b
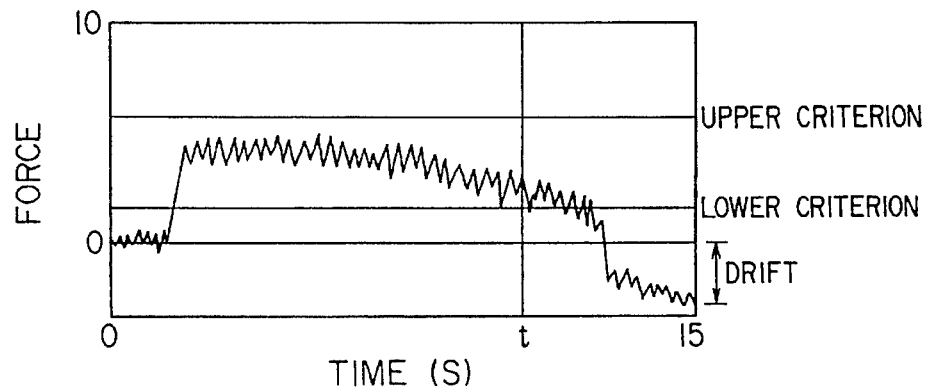
FIG. 4-c
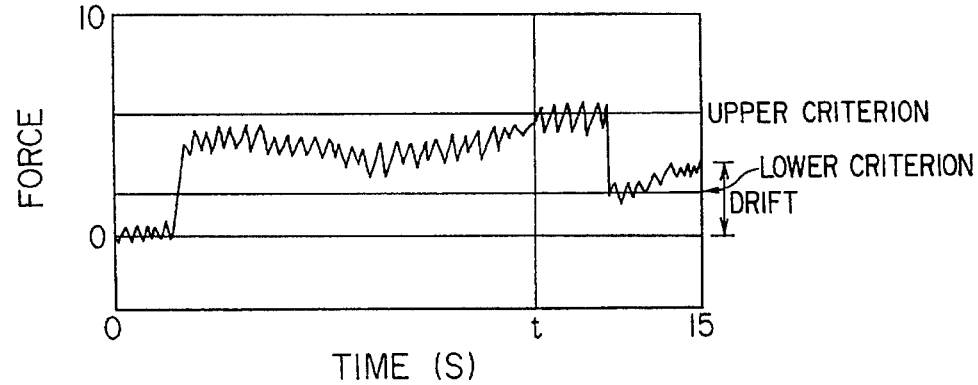

FIG. 5-a
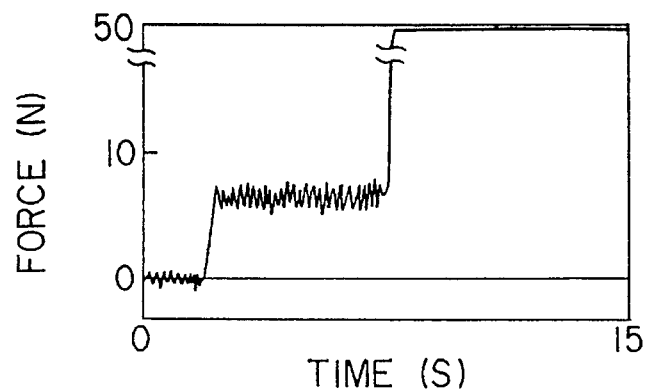
FIG. 5-b
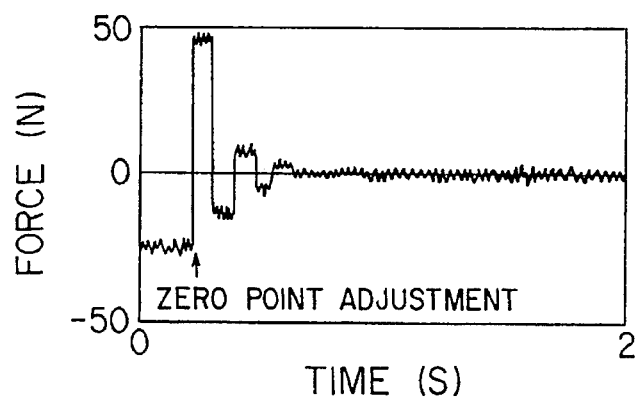
FIG. 5-c
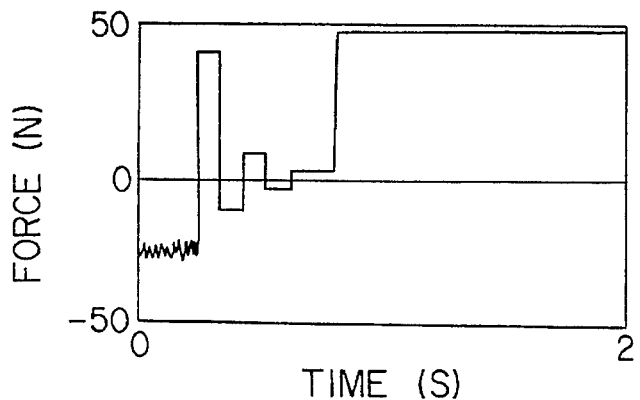

FIG. 16-a
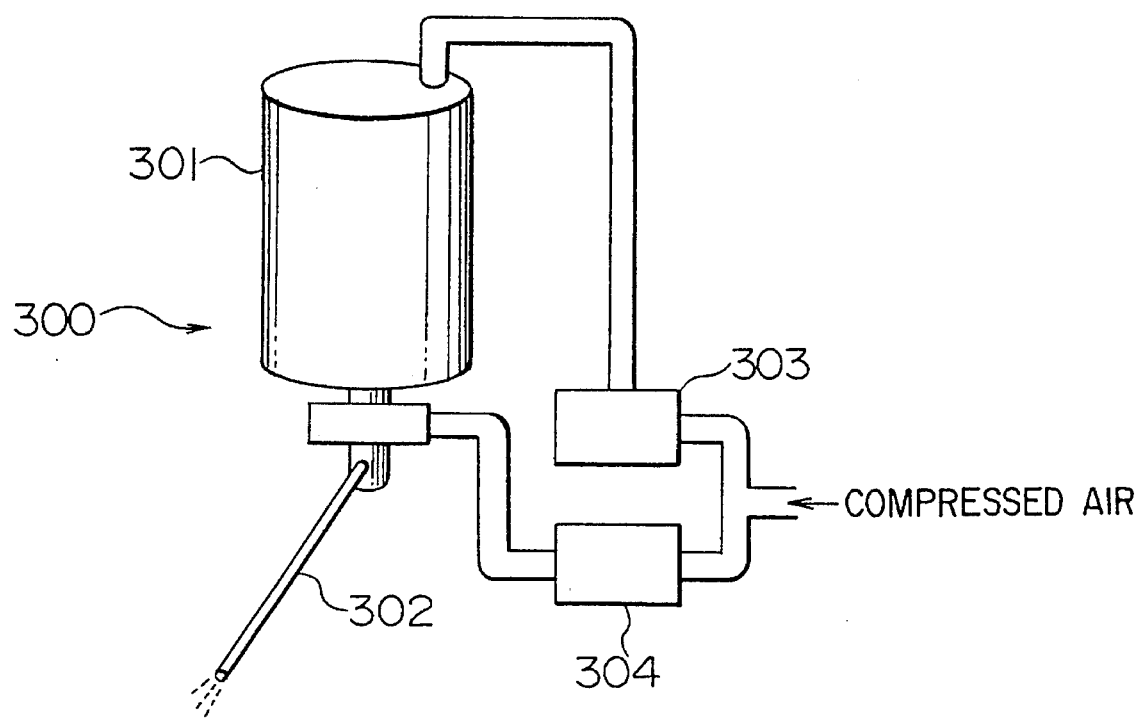
FIG. 16-b
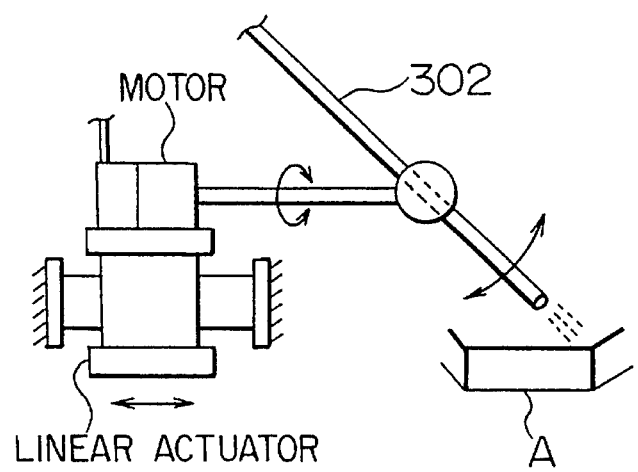

FIG. 19-a
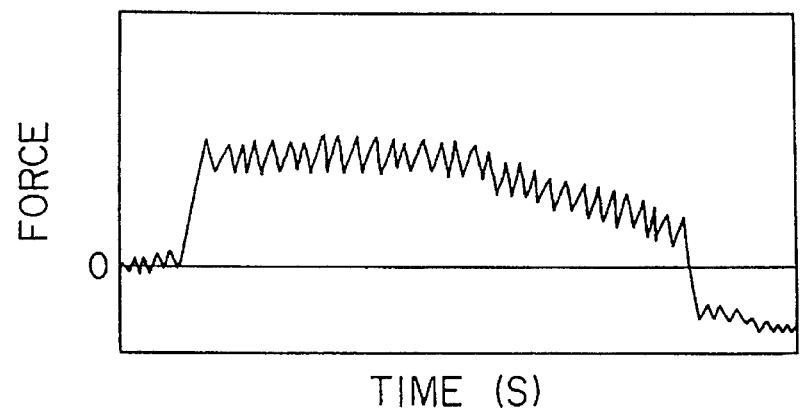
FIG. 19-b
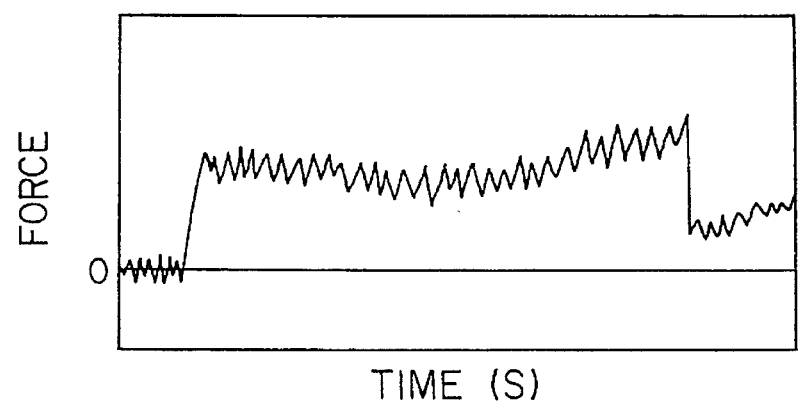
FIG. 19-c
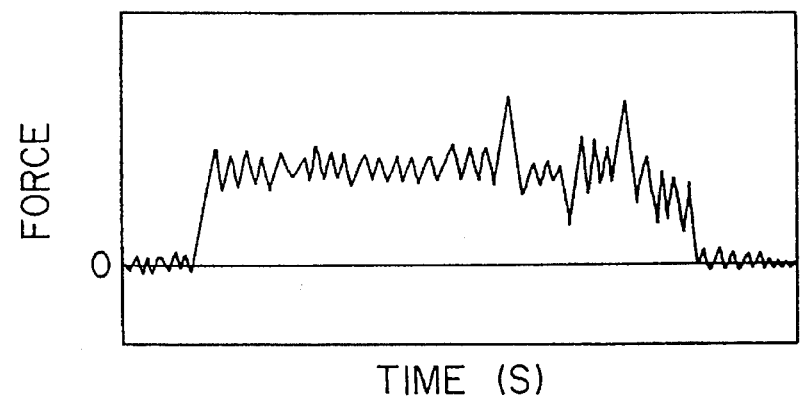

CUTTING APPARATUS

This application is a continuation of application Ser. No. 07/930,286, filed Aug. 14, 1992, now abandoned.

BACKGROUND OF THE INVENTION

The present invention relates to a machine tool which machines a metallic cylindrical member used for an image forming apparatus.

In the field of ultra precision machining, for example, in the field of machining photoreceptor drums or magnetic disk substrates, mirror-finishing is generally carried out. When products with a mirror-finish are inspected, not only the dimensional and configurational accuracy but also the degree of mirror-finishing is important, so that a very fine flaw such as a scratch, the width of which is about 10 μm, is not allowed.

When the surface of a product subjected to mirror-finishing is inspected, visual inspection is conducted at the present time. Skilled workers are required for visual inspection. Accordingly, problems are caused when machining is automated.

The following investigations have been carried out on the inspection of surface conditions.

(1) A technique to measure surface roughness of a workpiece with scattered light obtained when laser beams are projected on the surface of the workpiece. ("In-process Roughness Measurement of Mirror Turned Surfaces by Diffracted Light" by Kenji Morita and Yoichi Kawakubo; Journal of the JSPE, 1988, 642–646)

(2) A technique to measure and evaluate fine flaws on a machined surface with scattered light obtained when laser beams are projected on the surface of a workpiece. ("Measurement of Fine Scratches by Scattering of Electromagnetic Waves", by Takashi Miyoshi, Y. Kang, and Katsumasa Saito, Journal of the JSPE, 1988, 1095–1100)

(3) A technique to measure surface roughness under the non-contact condition by the critical angle method using laser beams. ("Outline of In-process Measurement and Workpiece-Referred From Accuracy Control" by Tsuguo Kohno, published in the text book of the symposium held by the JSPE, 1990, 1–5)

Machining conditions are monitored while consideration is given to vibrations caused in the process of machining, Acoustic Emission (AE) signals and heat flow, and the following investigation has been carried out.

(4) A technique to monitor entangled chips when consideration is given to heat flux. ("Realization of a machining environment based on measurement of heat fluxes-Evaluation of appropriateness of the result of measurement" by H. Nino, M. Rahman, and T. Inaba. Preprint of the JSPE, September, 1990, 583–584)

(5) A technique to realize wear of cutting tools with ultrasonic waves ("Realization of wear of cutting tools with an ultrasonic wave in-process sensor" by S. Itoh, F. Shirasawa, T. Inaba, and Y. Itoh. Preprint of the JSPE, September, 1990, 585–586)

In order to perform highly accurate machining, the following attempt has been made. According to the result of measurement of the configuration of a workpiece, feedback control is conducted so that a depth of cut can be controlled. ("Outline of In-process Measurement and Workpiece-Referred From Accuracy Control" by T. Kohno, published in the text book of the symposium held by the JSPE, 1990, 1–5)

An object of the conventional technique by which vibrations caused in the process of machining or AE signals are monitored, is to detect wear or damage of a cutting tool. In the case of the conventional technique by which heat flow is monitored, it is difficult to detect a quickly changing phenomenon, because information about heat is transmitted with a time delay. The aforementioned conventional technique is adopted for precision machining on an ordinary level, so that it is not appropriate for ultra precision cutting.

An optical measuring method which uses laser beams has the following drawbacks.

When surface configuration or roughness is optically measured with laser beams, it is difficult to match the tip of a cutting tool with a point in which measurement is carried out with a sensor. Consequently, the sensor can not detect information of the point in which machining is conducted, so that there is a small difference between the obtained information and the information of the point in which machining is being carried out.

A cutting lubricant is used in an actual machining process. Accordingly, when an optical measuring method is adopted, the result of measurement is affected by the cutting lubricant. Therefore, it is difficult to adopt the optical measuring method for a practical production process. When the optical measuring process is adopted, the workpiece must be measured after machining, so that it takes time for inspection.

Therefore, the inventors have taken notice of cutting force generated in the process of machining. The reason is described as follows. The cutting force is a physical quantity which is generated at a point in which machining is carried out. Accordingly, in accordance with the change of configuration or roughness of a workpiece surface, the cutting force is changed.

In order to judge a machining state of a workpiece from the data of cutting force generated in the process of machining, the criteria has been experimentally found, and in order to reduce the influence caused by the fluctuation of cutting force, a large allowance is made in the criteria.

Consequently, the criteria is not appropriate for ultra precision machining in which the machining state is finely varied.

When a sensor is damaged in the process of machining, damage of the sensor can not be realized, so that subsequent judgment becomes inaccurate or impossible.

At present, automatic setting of a monocrystal diamond cutting tool in the field of ultra precision machining has not yet been researched and developed. Accordingly, arrangements for a cutting tool is conducted by a skilled worker. The cutting tool is mounted on a cutting apparatus by trial and error, so that it takes a long period of time to arrange the cutting tool, and productivity can not be improved.

As described before, an optical method with laser beams has been investigated for the purpose of measuring the state of a surface. However, this measuring method has not been applied to automatic setting of a cutting tool.

When the optical measuring method is adopted, it is necessary to measure a workpiece after a trial machining operation has been carried out, so that it takes a long period of time for measurement. Therefore, in order to improve productivity, it is necessary to reduce measuring time. Further, in practical machining work, a cutting lubricant is utilized, so that the optical measuring method is affected by the lubricant oil. Therefore, in order to improve reliability of measurement, it is necessary to remove the cutting lubricant from the surface of the workpiece.

The inventors have studied cutting force generated in the process of machining so that the cutting force can be used as a parameter during measurement. It has been known that: when the center height or cutting tool setting angle is slightly changed, the surface condition of a workpiece is changed in the process of ultra precision cutting. Machining is a phenomenon carried out in accordance with the law of dynamics. Accordingly, when the surface condition is changed, the cutting force is also changed.

In the field of ultra precision cutting, in other words, in the field of machining a photoreceptor drum base or magnetic disk substrate, a natural monocrystal diamond cutting tool is utilized so as to obtain a mirror surface. Even when the cutting tool is set appropriately, chips are entangled or scratches are caused on the surface of a workpiece if the cutting lubricant is not supplied appropriately or chips are not collected properly.

Supply of cutting lubricant and collection of chips are adjusted by a worker who monitors the conditions of cutting lubricant supply and chip collection.

At present in the field of ultra precision machining, automatic adjustment of cutting lubricant supply and chip collection has not yet been researched and developed. Therefore, in an actual machining operation, cutting lubricant supply and chip collection are adjusted by trial and error.

As described before, an optical measuring method with laser beams has been investigated so as to measure the surface condition of a workpiece. However, the optical method has not been applied to adjustment of cutting lubricant supply and chip collection.

When the optical measuring method is adopted, it is necessary to measure a workpiece after a trial machining operation has been carried out, so that it takes a long period of time for measurement. Therefore, in order to improve productivity, it is necessary to reduce measuring time. Further, in practical machining work, a cutting lubricant is utilized, so that the optical measuring method is affected by the lubricant oil. Therefore, in order to improve reliability of measurement, it is necessary to remove the cutting lubricant from the surface of the workpiece.

Conventionally, cutting lubricant supply and chip collection are monitored and adjusted by a worker. Therefore, appropriate actions can not be taken in time, and a large number of defective products tend to be successively produced.

Accordingly, cutting lubricant supply and chip collection have an important effect on the result of machining.

The inventors have studied cutting force generated in the process of machining so that the cutting force can be used as a parameter during measurement. It has been known that: when the cutting lubricant supply condition or chip collecting condition is slightly changed, the surface condition of a workpiece is changed in the process of ultra precision cutting. Machining is a phenomenon carried out in accordance with the law of dynamics. Accordingly, when the surface condition is changed, the cutting force is also changed.

When an abnormally strong cutting force is applied to a force sensor, or when the force sensor collides with an object, the force sensor is damaged and it is difficult to restore. Accordingly, it is necessary to provide a protecting device in order to prevent the force sensor from being deformed beyond a predetermined range.

In general, the protecting device of a force sensor is arranged in the following manner: a strong block is provided on the external wall of the force sensor, and the block is provided with a small gap between the block surface and the outer wall of a cutting tool rest, wherein the gap can be adjusted by a screw mechanism; and when a strong force is applied to the force sensor, an abnormally large deformation of the sensor can be prevented by the block. In this case, it is necessary to adjust the aforementioned gap in a range of several microns to several tens microns. Therefore, it is difficult to adjust the gap so accurately with the screw mechanism. Accordingly, it takes a large amount of time to adjust the screw mechanism. That is, it is difficult to prevent the damage of the force sensor with such a structure as mentioned above.

SUMMARY OF THE INVENTION

The present invention has been achieved in view of the aforementioned problems. It is a primary object of the present invention to provide a cutting apparatus applied to the field of ultra precision machining, and the cutting apparatus can detect and realize the cutting condition and configuration of a workpiece in real time so that the obtained information can be fed back to the cutting operation.

Another object of the present invention is to provide a cutting apparatus applied to the field of ultra precision machining, wherein a cutting tool can be most appropriately set.

A further object of the present invention is to provide an adjusting device applied to the field of ultra precision machining, wherein the adjusting device can adjust the cutting lubricant supply condition and chip collecting condition to be the most appropriate.

A further object of the present invention is to provide a cutting apparatus characterized in that: an available range of a force sensor is very accurately set, so that damage of the force sensor can be prevented.

The aforementioned object can be accomplished by a cutting apparatus by which a metallic thin cylinder for use in an image forming apparatus is machined, and the cutting apparatus comprises: a detection means to detect a cutting force generated in a cutting tool when the workpiece is cut by the cutting tool; a memory means to store a plurality of mode pattern signals sent from the aforementioned detection means which are classified according to the surface condition of the metallic thin cylinder machined with the cutting apparatus in advance; and a comparison means which compares an output signal sent from the detection means in the process of cutting, with the plurality of mode pattern signals stored in the memory means, wherein the cutting apparatus detects the cutting condition of the metallic thin cylinder in real time when the output signal sent in the process of cutting, and the mode pattern signal which was set previously in accordance with cutting force data obtained in a trial machining process.

The aforementioned object can be accomplished by a cutting apparatus to cut a metallic thin cylinder, comprising: a detection means to detect a cutting force generated in a cutting tool when the workpiece is cut by the cutting tool; a displacement mechanism which fixes and displaces the cutting tool when the cutting tool is set; a memory means to store a plurality of mode pattern signals sent from the aforementioned detection means which are classified according to the surface condition of the metallic thin cylinder machined with the cutting apparatus; and a comparison means which compares an output signal sent from the detection means in the process of cutting, with the plurality of mode pattern signals stored in the memory means, wherein a set angle of the cutting tool is controlled from the output signal so that a value obtained when a cutting force fluctuation value is divided by a cutting force average value, can be minimum.

The aforementioned object can be accomplished by a cutting apparatus by which a metallic thin cylinder for use in an image forming apparatus is machined, and the cutting apparatus comprises: a detection means to detect a cutting force generated in a cutting tool when the workpiece is cut by the cutting tool; a memory means to store a plurality of mode pattern signals sent from the aforementioned detection means which are classified according to the surface condition of the metallic thin cylinder machined with the cutting apparatus; and a comparison means which compares an output signal sent from the detection means in the process of cutting, with the plurality of mode pattern signals stored in the memory means, wherein at least one of the cutting lubricant supply condition with respect to the cutting tool and the chip collecting condition is automatically detected in real time when the output sent in the process of cutting is compared with the plurality of mode pattern signals stored in the memory means by the comparison means.

The aforementioned object can be accomplished by a cutting apparatus by which a metallic thin cylinder for use in an image forming apparatus is machined, and the cutting apparatus comprises: a force sensor to detect a cutting force generated in the process of cutting which is provided on a cutting tool rest, wherein an activating range of the force sensor is regulated with a piezo electric element to prevent the force sensor from being damaged.

BRIEF DESCRIPTION OF THE DRAWINGS

FIGS. 2-*a*, 2-*b*, 2-*c*, 2-*d* to 2-*e* are views showing output waveforms of cutting force generated in the process of cutting;

FIGS. 4-*a*, 4-*b* to 4-*c* are views showing the relation between the variation of cutting force and the drift of output signal.

FIGS. 5-*a*, 5-*b* to 5-*c* are views showing fluctuation of cutting force generated in the process of cutting;

FIG. 16-*a* is a schematic illustration of a cutting lubricant supply device;

FIG. 16-*b* is a schematic illustration of an essential portion of the cutting lubricant supply device;

FIGS. 19-*a*, 19-*b* to 19-*c* are graphs showing waveforms of output signals of cutting force corresponding to various cutting conditions;

DETAILED DESCRIPTION OF THE PREFERRED EMBODIMENT

Figure 1:
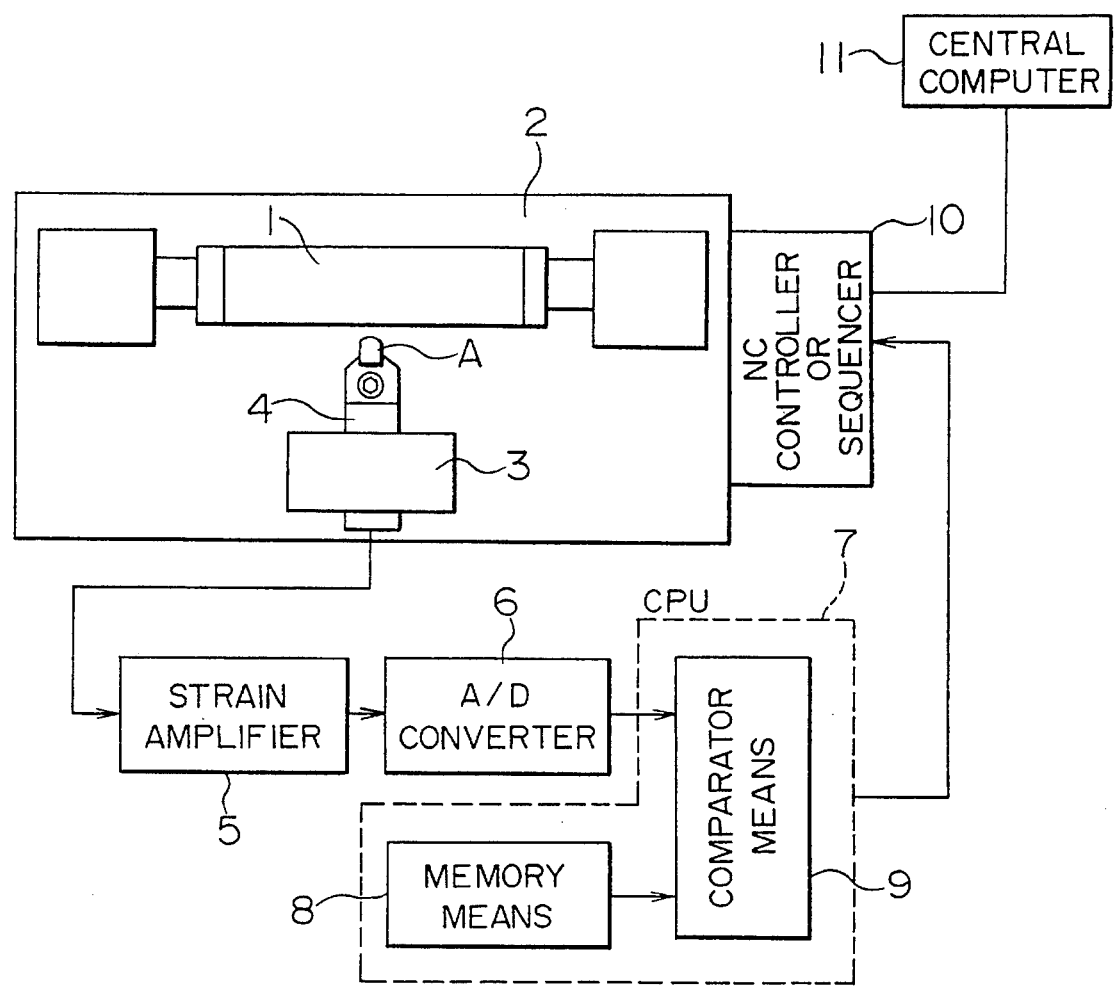
FIG. 1 is a schematic view of a cutting apparatus.

An embodiment of the cutting apparatus of the present invention will be explained as follows. FIGS. 1 to 5 show the first embodiment. FIG. 1 is a schematic illustration of the cutting apparatus, and FIGS. 2-*a* to 2-*e* are views showing output waveforms of cutting force.

A cutting apparatus of the present invention is provided to cut a metallic thin cylinder used for an image forming apparatus. A lathe 2 cuts a photoreceptor drum 1 which is a metallic thin cylinder member used for a copier or laser beam printer, so that the lathe 2 is provided with a cutting tool rest 3. A force sensor 4 to detect cutting force is mounted on the tool rest 3. This force sensor 4 composes a detection means to detect cutting force given to cutting tool A.

An output signal obtained by the force sensor 4 is amplified by a strain amplifier 5, and converted into a digital signal by an AD converter 6, and then taken into a computer 7. The computer 7 is connected with a memory and disk which compose a memory means 8. A plurality of mode pattern signals stored in the memory being classified according to the surface condition of a workpiece, and an output signal obtained by the force sensor 4 are compared by a comparison means 9 so that the cutting state can be detected. In the computer 7, a signal to control cutting is made. The control signal is sent to an NC device to control the lathe 2, or to a sequence device 10 through a digital IO board and RS232C interface.

The output signal obtained by the force sensor 4 may be inputted into the AD converter 6 after filtering has been conducted with a low-pass filter, high-pass filter and band-pass filter. The aforementioned filtering may be conducted in the software after the control signal has been AD-converted by the AD-converter 6, so that noise can be removed from the signal.

A method of detection of cutting force given to a cutting tool during a cutting process, is described in "Trial of a Monoblock Type 3-directional Force Sensor Holder for Disc Substrates of magnetic memory discs," by Y Hatamura and M. Adachi. Preprint of the JSPE, November 1989, 547–548. As described in the thesis, a cutting force detection holder into which a tool is integrally incorporated, can be utilized. The size of this holder is the same as that of a usual holder, so that the holder features a compact shape and high stiffness. When this holder is put into practical use, a mirror surface can be formed and the configuration can be formed as accurately as a common holder, which has been ensured through an experiment.

For example, strain amplifier DPM613B made by Kyowa Dengyo may be used for the strain amplifier 5, AD conversion board ADX-98E made by Canopus Co. is used for the AD converter, IO board PIO-24/24(98) made by Contec Co. is used for the interface board, and PC-9801UV made by NEC Co. is used for the computer.

An example will be described as follows in which this cutting apparatus was used so that the cutting condition was detected. The photoreceptor drum body 1 made of an aluminum thin cylinder was cut with the cutting apparatus, wherein the material of the thin cylinder was A5805, the diameter was 60 mm, and the thickness was 1 mm. A flat cutting tool made of natural mono-crystal diamond was utilized. The cutting conditions were as follows: the spindle speed is 6000 rpm, the feed rate is 0.2 mm/rev, and depth of cut is 20 μm.

When the photoreceptor drum body 1 is machined, it is important to maintain an excellent the surface condition. Specifically, defects such as vibrations, scratches, entangled chips, and portions which have not been cut, must be avoided. These defects are conventionally inspected by a worker by means of visual inspection. However, it has been found: when patterns of cutting force output signals are classified, the aforementioned defects can be detected from the output signals.

When the cutting force is detected, it is checked whether the force sensor 4 is operated normally or not. Specifically, the check is conducted as follows. In the force sensor 4, force is converted into strain with a strain gauge, so that the circuit is balanced with the strain amplifier 5 before the start of operation. When an output signal obtained after the circuit has been balanced, is in a range which has been previously set, it is judged that the force sensor 4 is in a normal operation. When there is a damage such as a disconnection in the circuit of the sensor 4, the output signal obtained after the circuit has been balanced, is out of the predetermined range, so that it is judged that the force sensor 4 is not in a normal operation.

FIG. 2-a shows an output signal waveform of cutting force corresponding to a normal cutting condition in which a mirror surface of 0.2 S to 0.3 S can be obtained. Concurrently with the start of cutting, the cutting force is detected. When consideration is given to the rise of the output signal of cutting force, the start of cutting is automatically judged. The output signal returns to approximately zero concurrently when the cutting operation has been completed. Accordingly, when consideration is given to this fall of the signal, the completion of cutting is automatically judged.

FIG. 2-b shows a waveform of an output signal in the case where vibrations have occurred in a workpiece. When vibrations have occurred, defective vibration marks are formed on the surface of the workpiece. Vibrations are caused when the cutting force is increased due to wear of a cutting tool, or when the vibration proof jig is not sufficient. According to FIG. 2-b, amplitudes of variation of cutting force are gradually increased as compared with the waveform of an output signal shown in FIG. 2-a. Accordingly, it can be said that the vibrations are caused by resonance.

FIG. 2-c shows a waveform of an output in the case where stripe-shaped scratches, the width of which is several mm, are caused. The aforementioned scratches are caused in the case where the cutting force is increased due to wear of a cutting tool so that burnishing effects become inappropriate.

This case features a pulse-shaped peak of cutting force. According to the results of observation of the photoreceptor drum body which has been machined, a scratch is caused in a position coincident with a peak of the waveform, so that the waveform of the output signal is completely coincident with the shape of the workpiece.

FIG. 2-d shows a waveform of an output signal in the case where chips are entangled. Since chips are entangled, the surface of a workpiece is damaged, so that the workpiece becomes defective. It can be seen from the drawing that the cutting force is increased in a position where chips are entangled.

FIG. 2-e shows a waveform of an output signal in the case where all the surface of a workpiece has not been cut. This case is caused when a material cylinder for the photoreceptor drum is deformed. In this case, a mirror surface can not be provided on a portion of the surface of the drum which has not been cut, so that the drum becomes defective. As can be seen from the drawing, a level of the cutting force output signal becomes zero in a portion of the surface of the drum which has not been cut.

In FIGS. 2-a to 2-e, data sampling frequency is 5 kHz. Some of the obtained data are omitted on the graphs for simplification.

As described above, there is a correlation between the surface condition of a workpiece and the output signal of cutting force. Accordingly, when the patterns of the correlation are previously stored and the patterns are compared with output signals obtained while the workpiece is being cut, the cutting conditions can be detected.

Criteria obtained through trial cutting are incorporated into the mode patterns of cutting force which are stored in the aforementioned memory means.

Figure 3:
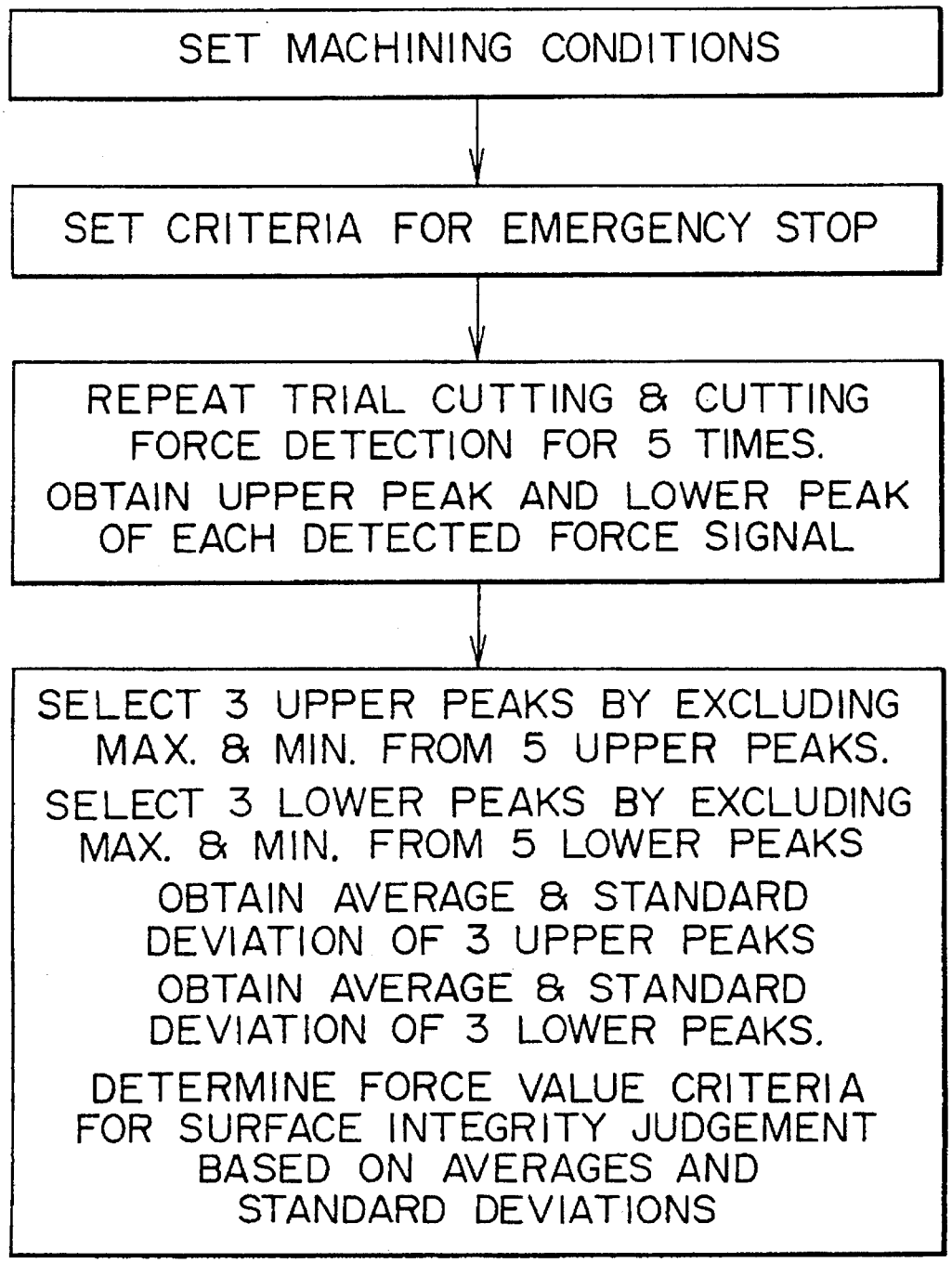
FIG. 3 is a flow chart showing a process to set upper and lower criteria with which judgment is conducted.

The aforementioned criteria of cutting force are determined according to the flow chart shown in FIG. 3.

When the trial cutting is carried out, appropriate cutting conditions are set on the basis of experiences and actual results. In case a problem is caused in the process of trial cutting, temporary criteria are set.

The trial cutting is performed 5 times at each cutting force in a normal cutting condition. The average ($F_{mean}$) and standard deviation ($F_{sigma}$) are found from the obtained upper peak cutting forces in the following manner: the maximum and minimum cutting forces are excluded from 5 peak values $F_{max}(1)$, $F_{max}(2)$, ..., $F_{max}(5)$ which have been obtained in 5 cutting operations, for example, on the assumption that $F_{max}(2)$ is maximum and $F_{max}(3)$ is minimum, the average ($F_{mean}$) and standard deviation ($F_{sigma}$) are calculated from $F_{max}(1)$, $F_{max}(4)$ and $F_{max}(5)$.

As a result, the upper limit ($F_{upper}$) of the criteria can be determined as follows.

$$F_{upper} = F_{mean} - \alpha 1 \cdot F_{sigma}$$

In the above equation, α1 is a proportional constant which is determined according to experience and know-how.

In the same manner as mentioned above, lower limit ($F_{lower}$) of the criteria is found as follows. The maximum and minimum values are excluded from lower peak values $F_{min}(1)$, $F_{min}(2)$, ..., $F_{min}(5)$. Then, $F_{mean}$ and $F_{sigma}$ are found from the residual 3 values. Lower limit ($F_{lower}$) is calculated from the following equation.

$$F_{lower} = F_{mean} - \alpha 2 \cdot F_{sigma}$$

When a cutting force is judged which has been detected with threshold values of upper limit ($F_{upper}$) and lower limit ($F_{lower}$), in the case of normal cutting shown in FIG. 2-a, the detected cutting force is in the range between the upper and lower limits.

In the case where vibrations are caused as shown in FIG. 2-b, the detected cutting forces exceed the upper and lower limits approximately at the same frequency.

In the case where stripe-shaped scratches are caused as shown in FIG. 2-c, the detected cutting force exceeds the upper limit of criteria of cutting force.

In the case where chips are entangled as shown in FIG. 2-d, the detected cutting forces exceed both the upper and lower limits, and the frequency to exceed the upper limit is higher than that to exceed the lower limit. In other words, the average of cutting force is increased.

In the case where all the surface is not cut as shown in FIG. 2-e, the detected cutting force exceeds the lower limit of the criteria.

The aforementioned judgment is conducted according to the following criteria with regard to consecutive 16 points in the case where sampling of cutting force is performed at 5 KHz.

For example, when a comparison is made between the frequency at which cutting force data of 16 consecutive points exceed the upper limit and the frequency at which cutting force data exceed the lower limit, the cutting condition can be judged as shown in Table 1. When the number of points which exceed the limits, becomes not less than 10, it can be judged that the cutting condition is abnormal.

TABLE 1

| Frequency exceeding the upper limit | Frequency exceeding the lower limit | Judgment of the cutting condition |
|---|---|---|
| 5 | 5 | Vibrations |
| 6 | 4 | Vibrations |
| 9 | 1 | Scratches |
| 7 | 3 | Entangled chips |
| 0 | 10 | Some portions have not been cut. |

The aforementioned frequencies are stored in the memory means, and compared with the data of cutting force detected in real time so that the cutting condition of the workpiece can be judged.

FIGS. 4-a to 4-c are graphs showing the relation between the variation of cutting force and the drift of the output signal. FIG. 4-a shows a normal cutting condition in which the cutting force at point t after 80% of cutting time (s) has passed, exceeds neither the upper nor lower limit, and the cutting force after cutting has been completed, is zero, that is, the drift is zero.

FIG. 4-b is a graph showing a condition in which the cutting force at point t exceeds the lower limit and the cutting force after the cutting has been completed, is not more than the zero level due to the factors such as the increase of temperature. FIG. 4-c is a graph showing a condition in which the cutting force at point t exceeds the upper limit, and the cutting force does not return to the zero level due to the decrease of temperature.

When the deviation from the zero level exceeds an appropriate value in the cases of FIGS. 4-b and 4-c, it is judged that the cutting force detection holder is thermally unbalanced and in an abnormal condition.

When the force sensor 4 which is a cutting force detection means, is in an abnormal condition, it can be detected as follows.

FIG. 5-a shows a case in which the force sensor 4 is damaged in the process of cutting. Of course, the detection of cutting force is interrupted.

When a new force sensor 4, the performance of which is normal, is installed, the cutting force is varied as shown in FIG. 5-b at the start of zero balance adjustment. However, right after that, the cutting force can be detected stably.

Conversely, when the force sensor 4 is abnormal, the cutting force can not be detected at all as shown in FIG. 5-c even when a zero balance adjustment is started, so that an abnormal pattern signal is provided.

According to the present invention, the cutting condition of a workpiece can be judged according to an objective criteria and realized in real time. As a result, a highly reliable automatic ultra precision cutting apparatus can be provided.

With reference to the attached drawings, the second preferred embodiment of the present invention will be explained as follows.

Figure 6:
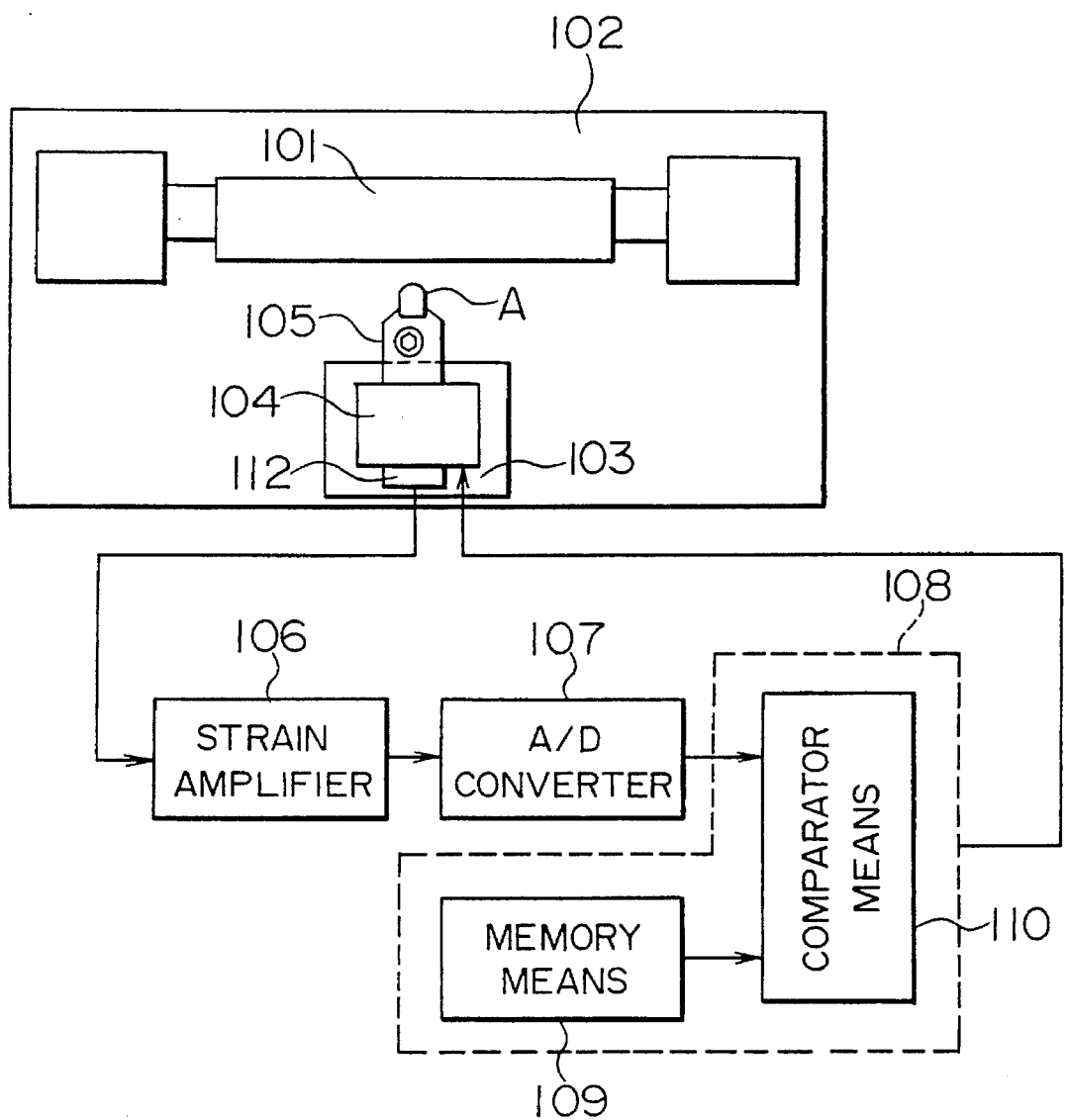
FIG. 6 is a schematic illustration showing the outline of the cutting apparatus.

FIG. 6 is a schematic illustration of a cutting apparatus of the second preferred embodiment. A cutting apparatus of the present invention is provided to cut a metallic thin cylinder used for an image forming apparatus. A lathe 102 cuts a photoreceptor drum 101 which is a metallic thin cylinder member used for a copier or laser beam printer, so that the lathe 102 is provided with a cutting tool rest 103. The cutting tool rest 103 is further provided with a displacement mechanism 104 which can be controlled with a control signal sent from the outside of the apparatus to adjust cutting tool A. A force sensor 105 which detects a cutting force in the process of cutting, is mounted on the displacement mechanism 104. This force sensor 105 composes a detection means to detect cutting force given to cutting tool A. An output signal obtained by the force sensor 105 is amplified by a strain amplifier 106, and converted into a digital signal by an AD converter 107, and then taken into a computer 108. The computer 108 is connected with an IC memory and disk which compose a memory means 109. A plurality of mode pattern signals stored in the memory being classified according to the surface condition of a workpiece, and an output signal obtained by the force sensor 105 are compared by a comparison means 110 so that the cutting state can be detected. After the cutting tool setting condition has been detected, a control signal is made to adjust the cutting tool setting condition, and sent to the displacement mechanism 104 through digital signal interface and RS232C so that the cutting tool setting condition can be automatically adjusted.

Figure 7:
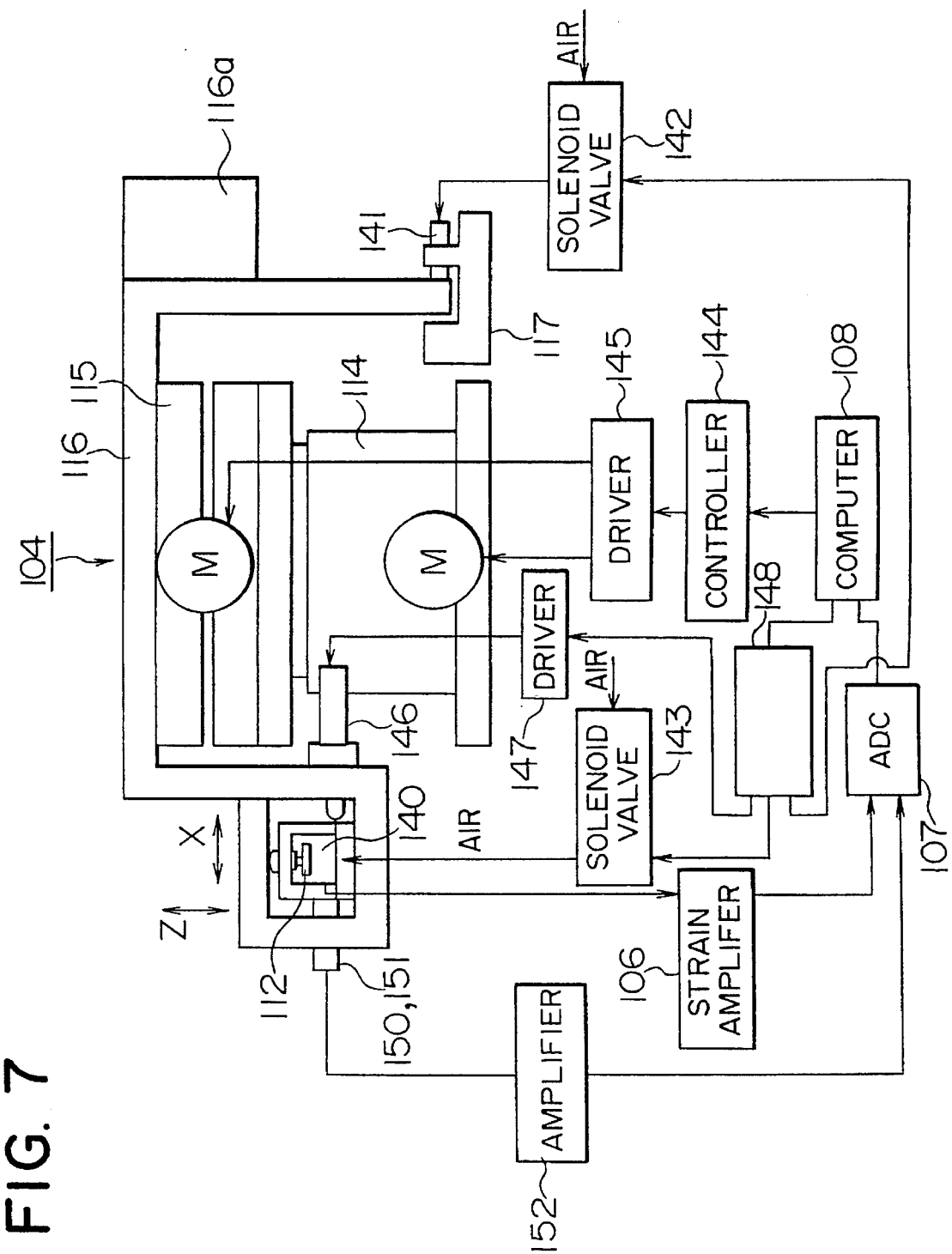
FIG. 7 is a schematic illustration showing an essential portion of the cutting apparatus.
Figure 8:
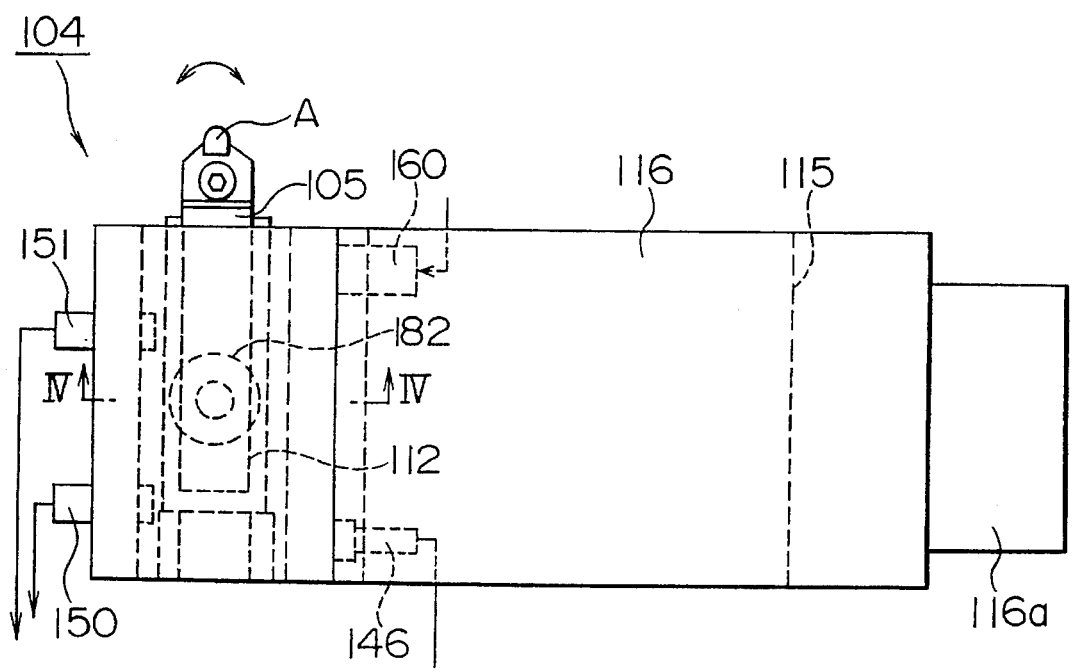
FIG. 8 is a plan view of an essential portion of the cutting apparatus.
Figure 9:
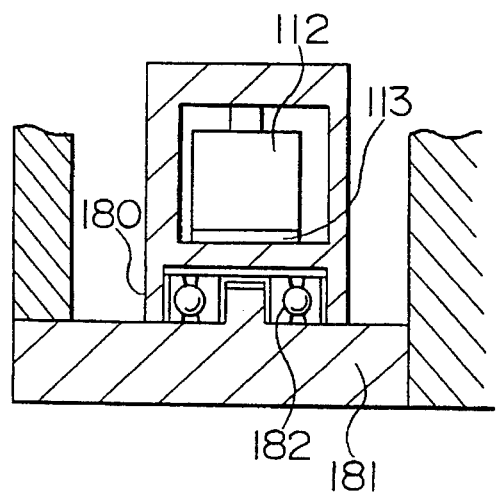
FIG. 9 is a sectional view taken on line IV—IV in FIG. 8.

FIG. 7 is a schematic illustration showing the structure of the cutting apparatus, FIG. 8 is a plan view of an essential portion of the cutting apparatus, and FIG. 9 is a sectional view taken on line IV—IV in FIG. 8.

Figure 14:
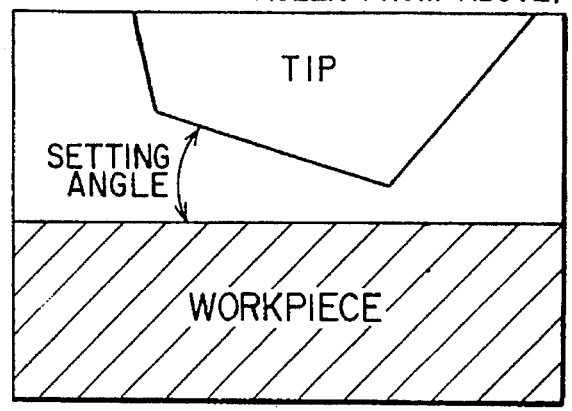
FIG. 14 is a schematic illustration showing a positional relation between a cutting tool and a workpiece.
Figure 13:
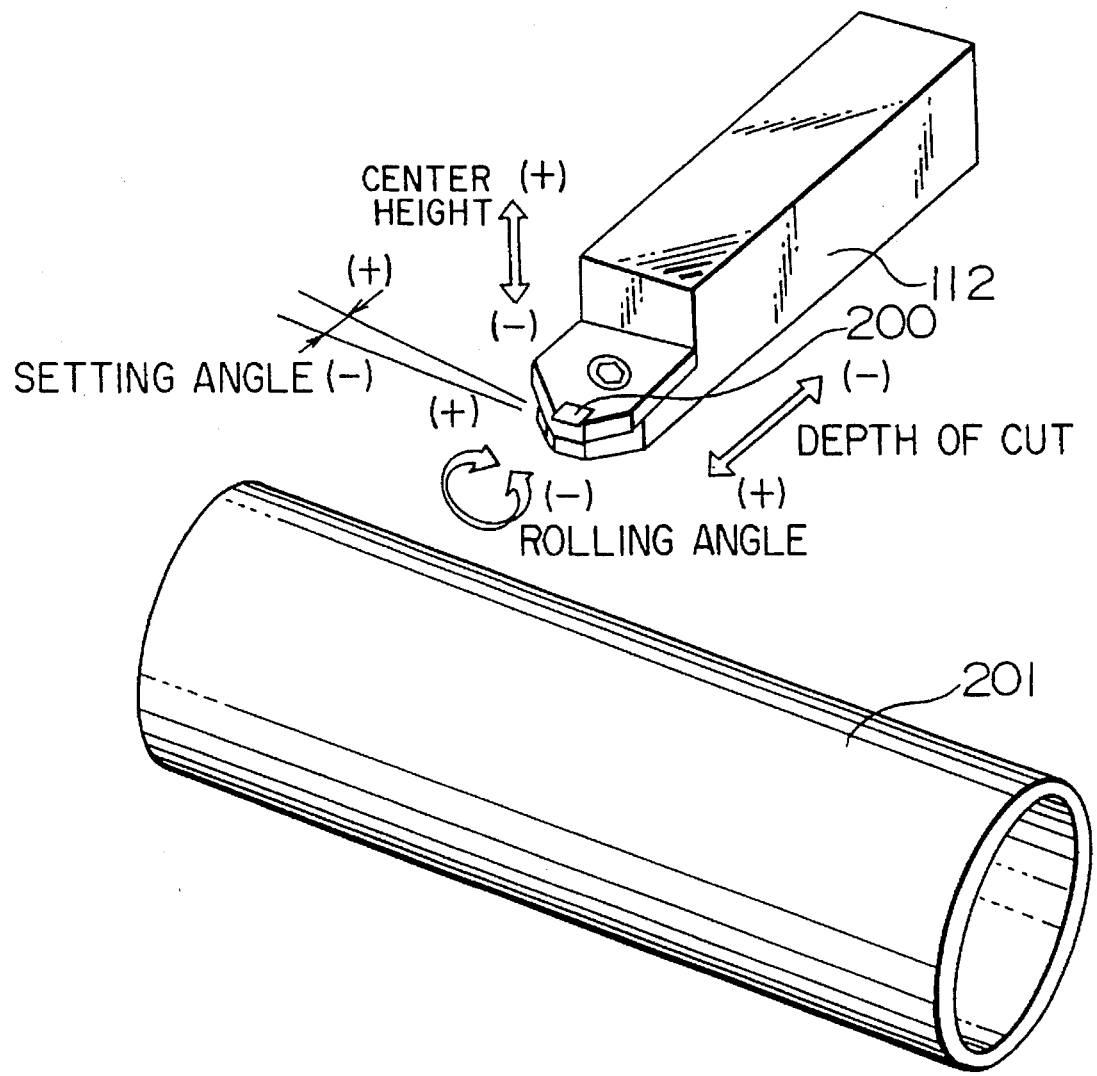
FIG. 13 is a schematic illustration showing the items of adjustment of a cutting apparatus.

The displacement mechanism 104 of the cutting apparatus is structured so that it can be adjusted in the three directions of center height, cutting tool setting angle and depth of cut, which are indicated in FIGS. 13 and 14.

Since the rolling angle is set to a certain setting value in accordance with the diameter of a workpiece, it is adjusted in this embodiment in such a manner that: a spacer 113 is provided below a cutting tool holder 112 so that the holder 112 is fixed. The rolling angle can be easily controlled by a signal sent from the outside of the cutting apparatus when the cutting tool is mounted on a generally known mechanism in which a rotating support mechanism and a motor are combined.

With regard to center height direction Z, a Z-axis stage 114 is utilized, and an X-axis stage 115 which is displaced in cutting direction X, is fixed onto the Z-axis stage 114. For example, a Z-axis stage MSDZ-120 made by Miyazawa Co., Ltd. may be used for the Z-axis stage 114, and an X-axis stage MSD-1-25 made by Miyazawa Co., Ltd. may be used for the X-axis stage 115.

As shown in FIG. 7, a C-shaped plate 116 including a counter weight 116a on its end, is disposed on the X-axis stage 115, and a tool angle setting mechanism 117 is disposed on the side of the X-axis stage 115.

The lower side of a cutting tool holder fixing section 180 is rotatably supported by a base plate 181 through a bearing 182 as shown in FIG. 9. A force is given from one end of the cutting tool holder fixing section 180 by an air cylinder 160, and the other end is pushed by a linear actuator 146, so that the cutting tool is displaced. For example, a linear actuator LA-30-10-F made by Harmonic Drive System Co., Ltd may be used for the linear actuator 146.

The displacement system can be easily realized by not only the aforementioned mechanism but also a conventional mechanism in which a straight and a rotary motion mechanism are combined.

After adjustments have been conducted with regard to each direction, the cutting tool is fixed with air clamp mechanisms 140, 141, and then cutting is performed. When electromagnetic valves 142, 143 are operated by a digital signal sent from the computer 108 through a digital IO board 148 so that each portion is clamped or unclamped.

The Z-axis stage 114 and X-axis stage 115 are driven by an exclusive controller 144 and driver 145. These controller 144 and driver 145 are connected with the computer 108 through, for example, a RS232C interface.

A linear actuator 146 to adjust tool setting angles is also driven by an exclusive driver 147. This driver 147 and the computer 108 are connected with a digital signal through a digital IO board 148.

The tool setting angle must be controlled the most accurately as compared with other adjusting items. Therefore, the inclination of the mount is measured by two displacement sensors 150, 151 to detect the tool setting angle, and then feedback control is conducted. Signals sent from the displacement sensors 150, 151 are amplified by an amplifier 152, converted into a digital signal by an A/D converter 107, and taken into the computer 108.

The aforementioned automatic adjusting device is applied to the cutting apparatus 104 used for the lathe 102 which machines the drum body 101 for use in a copier and a laser printer.

Detection signals obtained from the force sensor 105 may be inputted into the A/D converter 107 after they have been filtered by the low-pass, high-pass and band-pass filters, or after the detection signals have been A/D-converted, they may be filtered in the software. In this manner, noises are removed from the detection signal.

In this embodiment, cutting force is detected with a cutting force detection holder incorporated into a cutting tool which is described in page 111 to page 112 of "An attempt of monoblock type three-component holder for cutting a magnetic disk" by Hiroshi Hatamura and Mitsuaki Adachi published in the Theses of 1988 Autumnal Convention of Precision Engineering Society. The size of this holder is the same as that of the holder of a conventional cutting tool, so that it features a compact shape and high rigidity. In fact, it has already been checked that a mirror surface was obtained and an accurate shape was formed with this holder.

A strain amplifier 6M84 made by NEC San-ei Instruments, Ltd. can be used for the strain amplifier 106. An A/D converting board ADA12-8/2(98) made by Contec Co., Ltd. can be used for the A/D converter 107. An IO board PIO-32/32 made by Contec Co., Ltd. can be used for the digital interface board. A PC-9801RX2 made by NEC Co., Ltd. can be used for the computer 108. An AH-416 made by Keyence Co., Ltd. can be used for the displacement sensors 150, 151.

In order to obtain a mirror surface with the aforementioned cutting apparatus, an experimental cutting was carried out as described below.

The experiment was conducted under the following conditions to detect the cutting force: the revolutional speed of the spindle was 3000 rpm, the feed rate was 0.2 mm/rev, and depth of cut was 15 μm.

Figure 10:
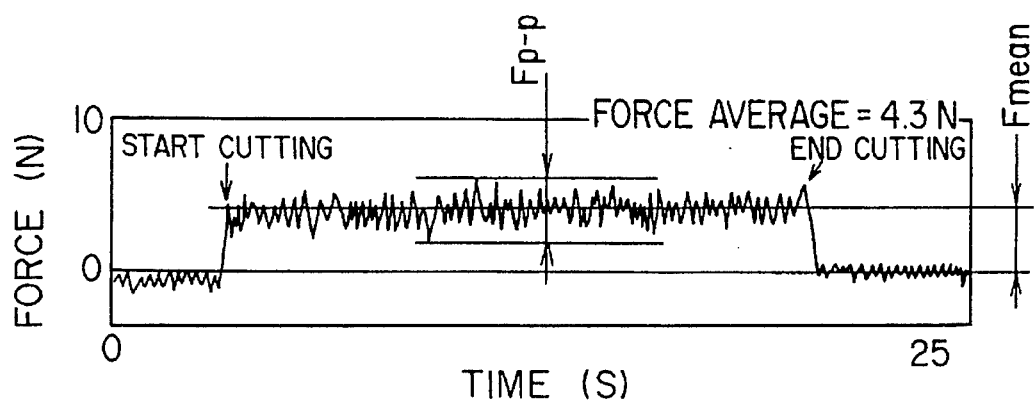
FIG. 10 is a view showing waveforms of an output signal of cutting force corresponding to a normal cutting condition in which a mirror surface can be obtained.

FIG. 10 shows a waveform of an output signal of cutting force (a principal force) corresponding to a normal cutting condition in which a mirror surface, the surface roughness of which is 0.2 S to 0.3 S, can be obtained. Concurrently when a cutting operation has started, the cutting force is detected, and it returns to zero concurrently with the completion of cutting. The sampling frequency of this waveform data of the output signal of cutting force (the principal force) is 5 KHz. Some of the obtained data are omitted for simplification.

Figure 11:
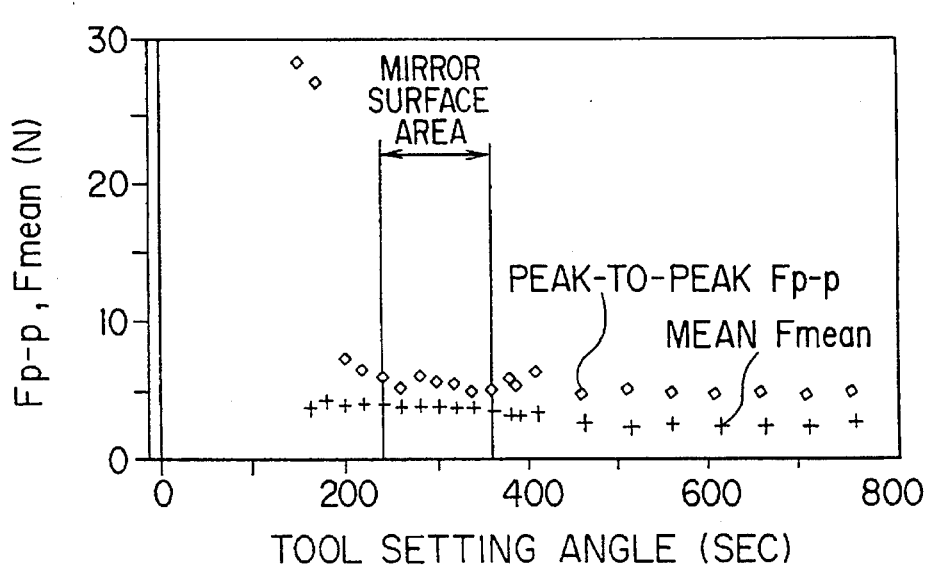
FIG. 11 is a graph showing a relation between a cutting tool set angle and a fluctuation and an average of cutting force.

FIG. 11 is a graph showing a relation between fluctuation value $F_{p-p}$ of cutting force and the tool setting angle, and further showing a relation between average value $F_{mean}$ and the tool setting angle. When the tool setting angle becomes small, stripe-shaped flaws, the width of which is several mm, are caused on the cutting surface, so that fluctuation of cutting force is sharply increased. Accordingly, it is possible to automatically control the tool setting angle of tool A by feeding back this phenomenon so that the tool setting angle can be controlled to obtain a mirror surface.

Results of an example of tool angle setting are shown in Table 2.

TABLE 2

| Initial Setting Angle (sec) | Number of Adjustment (time) | Convergent Angle (sec) | Adjustment Error (sec) |
|---|---|---|---|
| 160 | 2 | 210 | −90 |
| 210 | 1 | 260 | −40 |
| 300 | 5 | 250 | −50 |
| 510 | 7 | 185 | −115 |
| 560 | 8 | 205 | −95 |

However, according to this method, the following problems are caused: the tool setting angle is converged upon a value smaller than the most appropriate value; and even when a mirror surface is obtained during adjustment, it can not be recognized.

Figure 12:
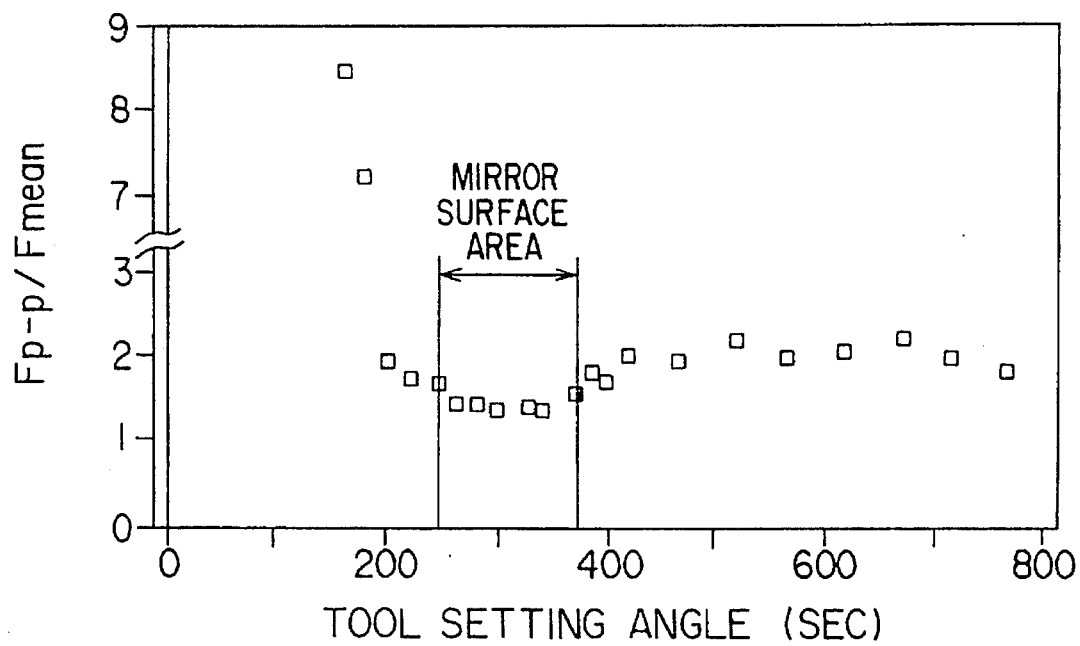
FIG. 12 is a graph showing a relation between a cutting tool set angle and a fluctuation/average of cutting force.

Therefore, the inventors contemplated a value obtained when fluctuation value $F_{p-p}$ of cutting force was divided by average value mean, and they confirmed the following fact: when the tool setting angle was set in such a manner that the value obtained when fluctuation value $F_{p-p}$ of cutting force was divided by average value $F_{mean}$, could be minimum as shown in FIG. 12, a mirror surface was obtained.

Results of an example of adjustment of tool setting angle are shown in Table 3. In this example, the adjustment of the setting angle is made as in the same way as the aforementioned example. In this example, it could be recognized that the tool setting angle was set in the mirror surface region, so that the number of adjustment was reduced to 1/2.5 and the adjustment error was reduced to ½ as compared with the adjustment method described before. Therefore, the tool setting angle could be set accurately so that a mirror surface was provided.

TABLE 3

| Initial Setting Angle (sec) | Number of Adjustment (time) | Convergent Angle (sec) | Adjustment Error (sec) |
| --- | --- | --- | --- |
| 160 | 1 | 260 | −40 |
| 210 | 3 | 21 | −90 |
| 300 | 0 | 300 | 0 |
| 510 | 2 | 310 | 10 |
| 560 | 3 | 320 | −20 |

According to the present invention, the tool setting angle of a cutting tool can be automatically adjusted to the most appropriate value, so that a cutting device to obtain an accurate mirror surface can be provided.

Figure 15:
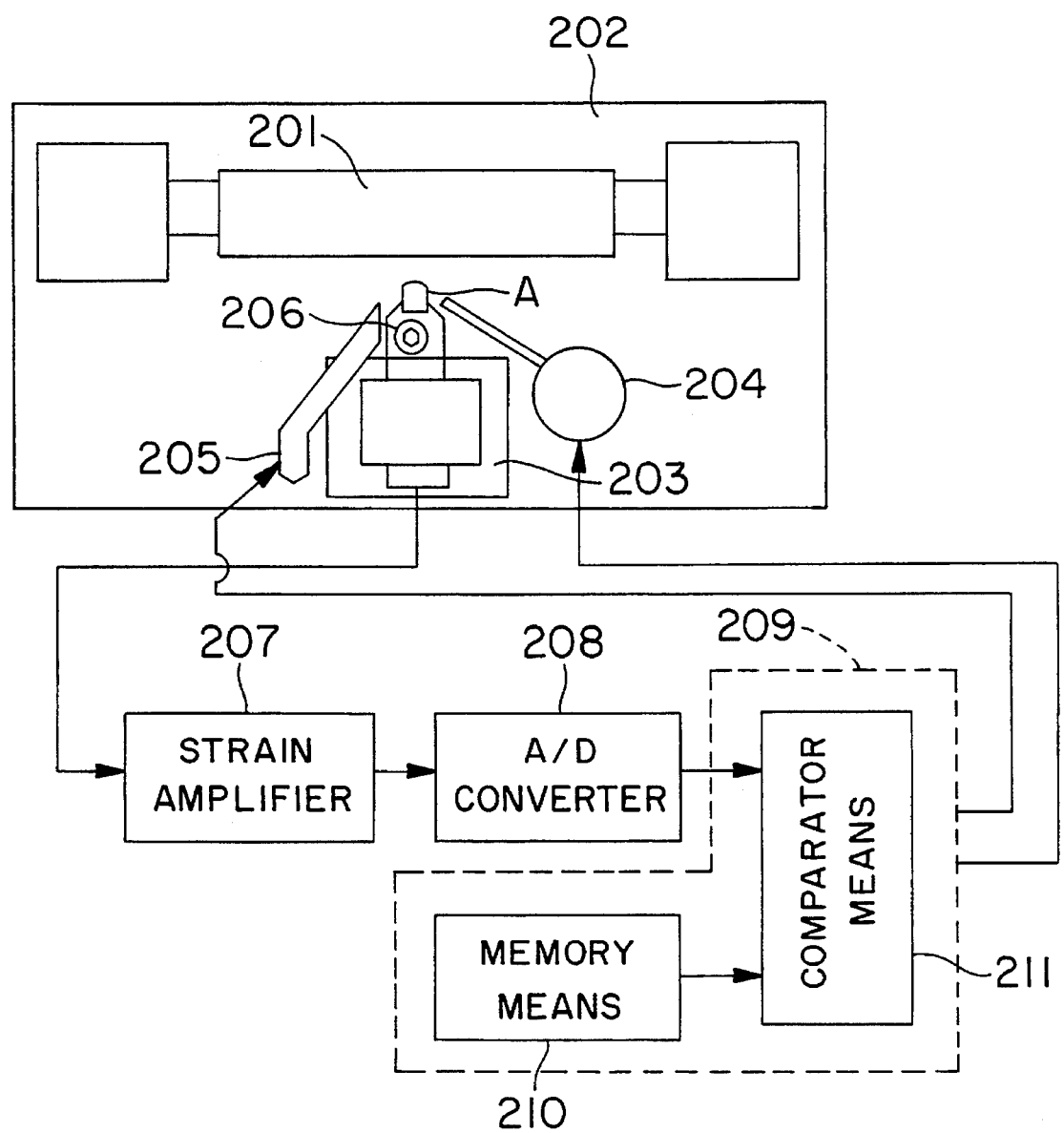
FIG. 15 is a schematic illustration showing the structure of a cutting apparatus.

With reference to the attached drawings, the third example of the present invention will be explained as follows. FIG. 15 is a schematic illustration showing the outline of structure of a cutting apparatus. A cutting apparatus of the present invention is provided to cut a metallic thin cylinder used for an image forming apparatus. A lathe 202 cuts a photoreceptor drum 201 which is a metallic thin cylinder member used for a copier or laser beam printer, so that the lathe 202 is provided with a cutting tool rest 203. A force sensor 206 is mounted on the tool rest 203, and this force sensor 206 constitutes a detection means to detect cutting force of cutting tool A. A detection signal obtained from the force sensor 206 is amplified by a strain amplifier 207, converted into a digital signal by an A/D converter 208, and taken into a computer 209. The computer 209 is connected with a memory and disk which serves as a recording means 210. Signals of a plurality of mode patterns which are stored in the recording means 210 and classified according to a cutting lubricant supplying condition and a chip collecting condition, and an output signal obtained from the force sensor 206 are compared with each other by a comparison means 211 to detect the cutting lubricant supplying condition and the chip collecting condition. After the aforementioned cutting lubricant supplying condition and chip collecting condition have been detected, a control signal to automatically control the cutting lubricant supplying condition and the chip collecting condition is made. The control signal is sent to a cutting lubricant supplying condition adjusting mechanism 204 and a chip collecting condition adjusting mechanism 205 through a digital signal RS232C interface, so that the cutting lubricant supplying condition and the chip collecting condition are automatically adjusted.

In this embodiment, cutting force is detected with a cutting force detection holder incorporated into a cutting tool which is described in "Trial of a Monoblock Type 3-directional Force Sensor Holder for Disc Substrates of magnetic memory discs." by Y. Hatamura and M. Adachi. Preprint of the JSPE, November 1989, 547–548. The size of this holder is the same as that of the holder of a conventional cutting tool, so that it features a compact shape and high rigidity. In fact, it has already been checked that a mirror surface was obtained and an accurate shape was formed with this holder.

A strain amplifier 6M84 made by NEC San-ei Instruments, Ltd. can be used for the strain amplifier 207. An A/D converting board ADA12-8/2(98) made by Contec Co., Ltd. can be used for the A/D converter 208. An IO board PIO-32/32 made by Contec Co., Ltd. can be used for the digital interface board. A PC-9801RX2 made by NEC Co., Ltd. can be used for the computer 209.

In this case, a workpiece is a thin cylinder made of aluminum A5805, the diameter of which was 80 mm and the thickness was 1.5 mm. A flat cutting tool made of natural diamond was used. The cutting conditions were as follows: the spindle speed was 6000 rpm, the feed rate was 0.2 mm/rev, and depth of cut was 20 μm. The rolling angle was set at 13 degrees.

Cutting lubricant was automatically supplied to the aforementioned cutting tool with the following cutting lubricant supplying device 300.

FIGS. 16a and 16b show the structure of a cutting lubricant supplying device 300. Cutting lubricant in a tank 301 is pressurized by compressed air and sprayed with a needle spray gun 302. At this time, an amount of cutting lubricant is adjusted with one electronic regulator 303, and spraying pressure is regulated with the other electronic regulator 304, so that an appropriate amount of cutting lubricant of appropriate pressure is sprayed on the cutting tool.

Figure 18:
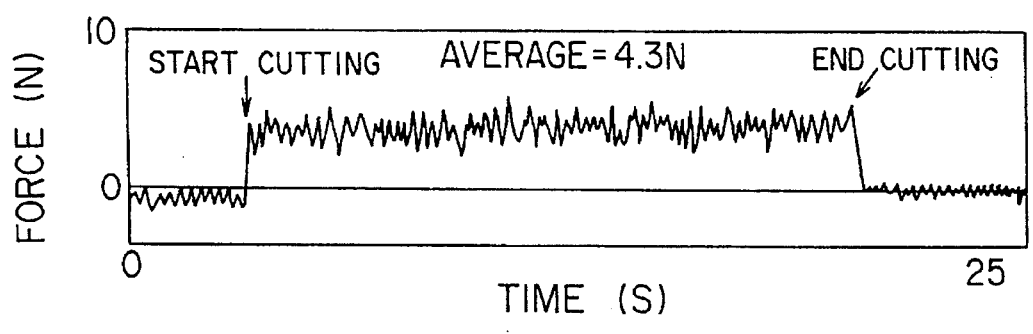
FIG. 18 is a view showing waveforms of an output signal of cutting force corresponding to a normal cutting condition in which a mirror surface can be obtained.

FIG. 18 shows a waveform of an output signal of cutting force (pincipal force) corresponding to a normal cutting state in which a mirror surface, the surface roughness of which is 0.2 S to 0.3 S, can be obtained. Concurrently when a cutting operation is started, a cutting force is detected, and concurrently when the cutting operation is completed, the cutting force returns to approximately zero. The sampling frequency of the waveform data of the output signal of this cutting force (pincipal force) is 5 KHz. Some of the data are omitted for simplification.

In this case, a drift of output waveforms caused by thermal influence in the cutting process is not recognized. Accordingly, the amount of cutting lubricant to be supplied is appropriate, so that the aforementioned electronic regulators 303, 304 are maintained in a balanced condition.

FIG. 19-a is a graph showing a condition in which: even after a cutting operation has been completed, the cutting force is not returned to zero, and a drift of output waveform occurs due to the influence of heat generated during the cutting process. Consequently, it shows that the supply of cutting lubricant to the aforementioned cutting tool is not sufficient.

In this case, the electronic regulator 303 is automatically adjusted so that the amount of cutting lubricant can be increased. Accordingly, the amount of cutting lubricant sprayed from the needle spray gun 302 is increased so that cooling of the cutting tool can be facilitated. When necessary, the spraying pressure of cutting lubricant is adjusted with the electronic regulator 304 so that it can be increased.

FIG. 19-b is a graph showing a condition in which cutting force returns to a position higher than zero, that is, a reverse drift of output wave form occurs. Accordingly, it shows that an excessive amount of cutting lubricant is supplied.

In this case, the electronic regulator 303 is automatically adjusted so that the amount of supply of cutting lubricant can be reduced, and the amount of cutting lubricant sprayed from the needle spray gun 302 is reduced to prevent supercooling of the cutting tool. When necessary, the spraying pressure of the electronic regulator 304 is reduced.

FIG. 19-c is a graph showing a waveform of an output in a condition in which chips are entangled. In this case, a drift of output waveform caused by heat generated during the cutting process is not recognized, and a cutting force having abnormally large amplitudes is generated.

In this case, only the spraying pressure of the electronic regulator 304 is increased so that entangled chips are forcibly removed.

In the case where the cutting condition can not be improved even when the amount of cutting lubricant and the spraying pressure are adjusted, the cutting lubricant supplying position and chip collecting condition are adjusted as follows.

As shown in FIG. 16-b, the position to supply cutting lubricant is adjusted so that cutting lubricant can be directly sprayed on a cutting point in the following manner: a linear actuator is moved in the direction of an arrow mark; a motor is rotated in the direction of an arrow mark; and a setting angle of the needle spray gun is adjusted.

Figure 17:
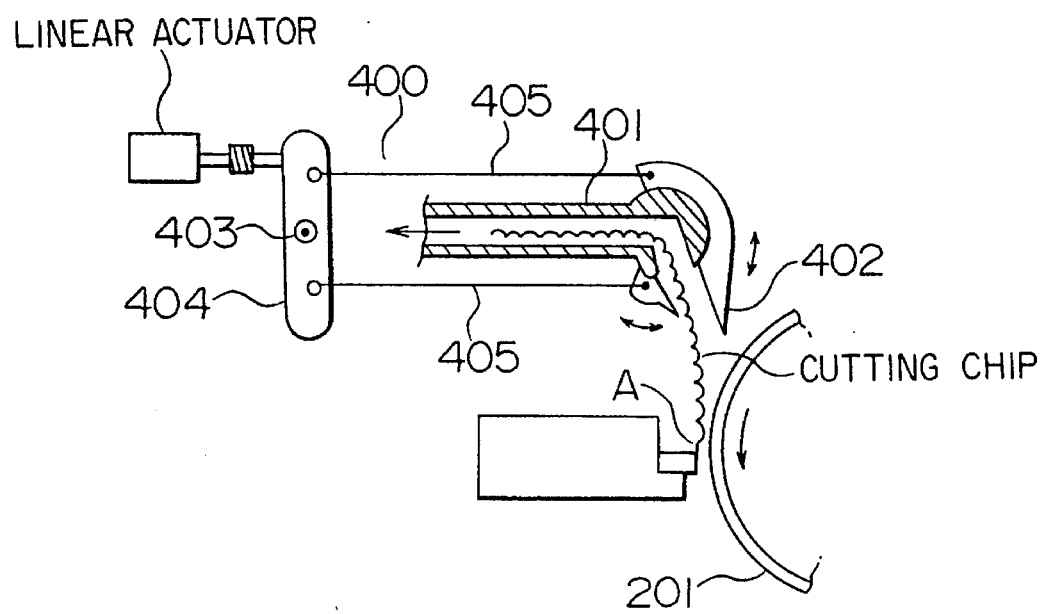
FIG. 17 is a schematic illustration of an adjusting apparatus for chip collection hood.

As shown in FIG. 17, an adjusting device 400 is adjusted so that chips can be always effectively collected.

A chip collecting hood inlet 402 including a pair of rotatable members which can be rotated along the tip portion of a chip taking-in inlet 401, is connected with an oscillating member 404 which is oscillated around a rotating shaft 403 by a linear actuator, through a rod 405. When the linear actuator is controlled, a chip collecting hole of the tip of the chip collecting hood inlet 402 can be rotated in a direction of an arrow mark shown in FIG. 17. When a gear mechanism driven by a motor is provided, the entire device can be rotated in a rolling direction.

When the direction of the aforementioned chip collecting hood inlet is adjusted in accordance with the direction of chips generated from the tip of cutting tool A while the photoreceptor drum body 201 is cut, the chips are effectively collected, and entanglement of chips can be prevented so that the photoreceptor drum body 1 can be excellently machined.

According to the present invention, a cutting apparatus can be provided which is characterized in that: cutting lubricant is appropriately supplied and chips are effectively collected, so that an abnormal cutting condition caused by a drift or entanglement of chips can be eliminated, and a mirror surface can be always obtained.

Figure 20:
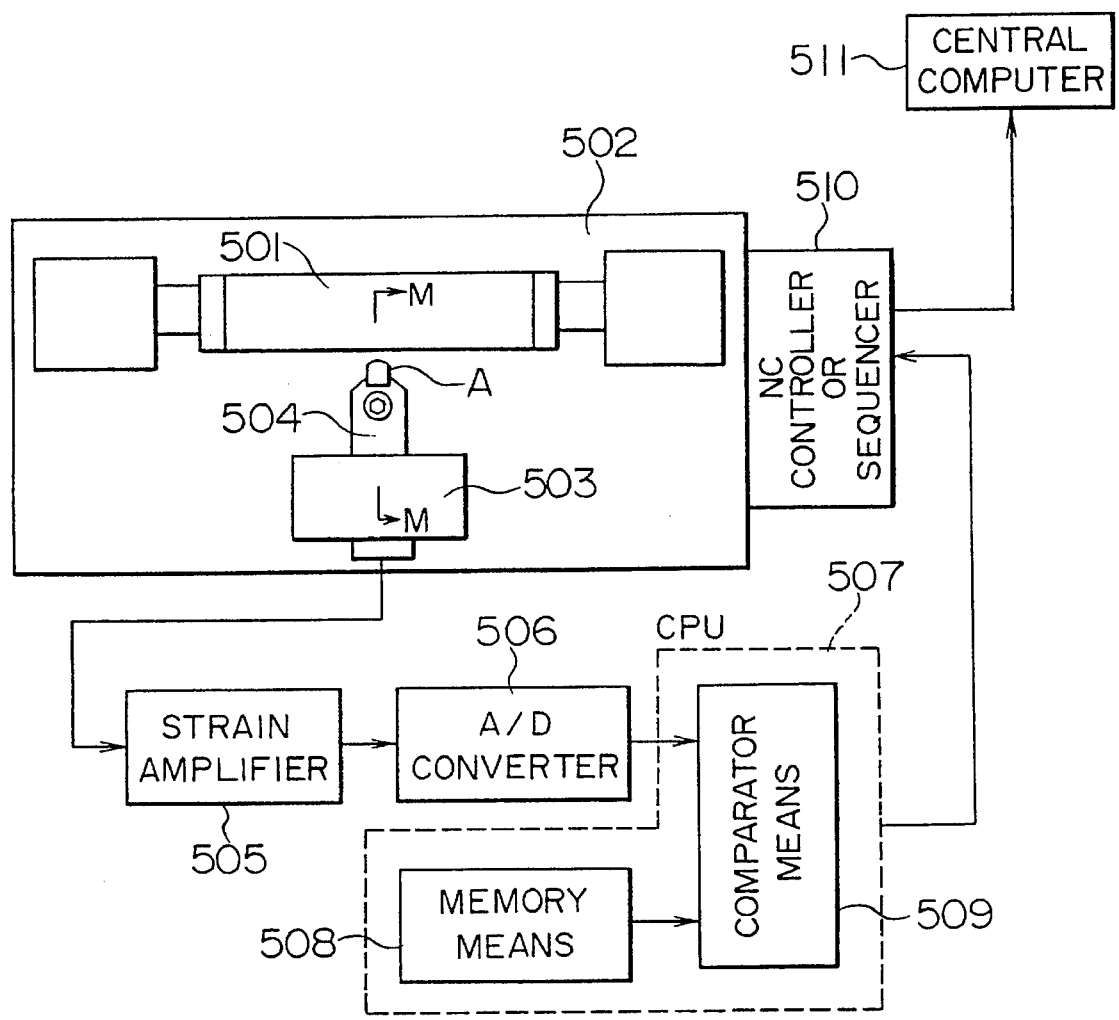
FIG. 20 is a schematic illustration of a cutting apparatus.
Figure 21:
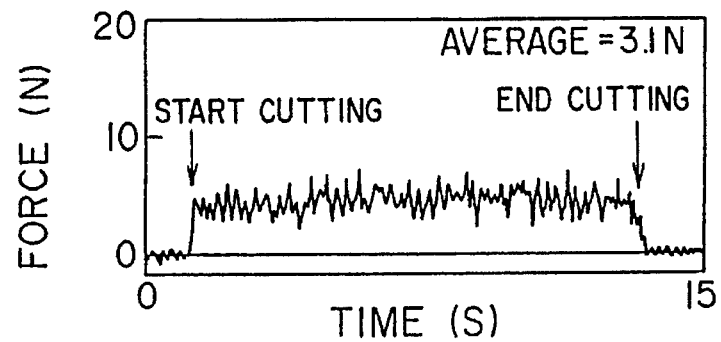
FIG. 21 is a graph showing a waveform of an output signal of cutting force.

The fourth example of the cutting apparatus of this invention will be explained as follows. FIG. 20 is a schematic illustration of the cutting apparatus, and FIG. 21 is a graph showing an output waveform of cutting force.

A cutting apparatus of the present invention is provided to cut a metallic thin cylinder used for an image forming apparatus. A lathe 502 cuts a photoreceptor drum 501 which is a metallic thin cylinder member used for a copier or laser beam printer, so that the lathe 502 is provided with a cutting tool rest 503. A force sensor 504 in which strain gauges are utilized, is mounted on the tool rest 503, and this force sensor 504 constitutes a detection means to detect cutting force of cutting tool A.

A detection signal obtained from the force sensor 504 is amplified by a strain amplifier 505, converted into a digital signal by an A/D converter 506, and taken into a computer 507. The computer 507 is connected with a memory and disk which serves as a recording means 508. A plurality of mode pattern signals stored in the memory being classified according to the surface condition of a workpiece, and an output signal obtained by the force sensor 504 are compared by a comparison means 509 so that the cutting state can be detected. In the computer 507, a signal to control cutting is made after detection. The control signal is sent to an NC device or a sequence device 510 to control the lathe 502 through a digital IO board and RS232C interface.

Detection signals obtained from the force sensor 504 may be inputted into the A/D converter 506 after they have been filtered by the low-pass, high-pass and band-pass filters, or after the detection signals have been A/D-converted by the A/D converter 506, they may be filtered in the software. In this manner, noises can be removed from the detection signal.

In this embodiment, cutting force is detected with a cutting force detection holder incorporated into a cutting tool which is described in "Trial of a Monoblock Type 3-directional Force Sensor Holder for Disc Substrates of magnetic memory discs." by Y. Hatamura and M. Adachi. Preprint of the JSPE, November 1989, 547–548. The size of this sensor is the same as that of the holder of a conventional cutting tool, so that it features a compact shape and high rigidity. In fact, it has already been checked that a mirror surface was obtained and an accurate shape was formed with this sensor.

A strain amplifier made by Kyowa Dengyo Co., Ltd. may be used for the strain amplifier 505. An AD conversion board ADX-98E made by Canopus Co., Ltd. may be used for the AD converter. An IO board PIO-24/24(98) made by Contec Co., Ltd. may be used for the interface board. A PC-9801UV made by NEC Co., Ltd. may be used for the computer.

Next, an example will be described in which a cutting condition was detected with this cutting apparatus. In this case, a workpiece is a thin cylinder made of aluminum A5805, the diameter of which was 60 mm and the thickness was 1 mm. A flat cutting tool made of natural diamond was used. The cutting conditions were as follows: the spindle speed was 6000 rpm, the feed rate was 0.2 mm/rev, and depth of cut was 20 μm.

When the photoreceptor drum body 501 is machined, the surface condition is important. Defects to be prevented are as follows: vibrations, scratches, entanglement of chips, and portions which have not been cut. Conventionally, these defects are recognized by means of visual inspection. However, it has been found that these defects can be detected when the patterns of output signals of cutting force are classified.

When cutting force is detected, it is checked whether the force sensor 504 is in a normal operation or not. Specifically, the check is performed in the following manner: since the force sensor 504 detects a force by converting the force into a strain with a strain gauge, the circuit of the strain amplifier 505 is balanced before the operation; and when an output signal obtained after the balancing operation is in a predetermined range, it is judged that the sensor is in a normal operation. In the case where a problem such as breaking of wire is caused in the circuit of the sensor 504, the output signal obtained after the balancing operation is out of the predetermined range. Accordingly, it can be judged that the sensor is not in a normal operation.

FIG. 21 is a graph showing an output signal of cutting force corresponding to a normal cutting condition in which a mirror surface, the surface roughness of which is 0.2 S to 0.3 S, is obtained. Concurrently with the start of cutting, the cutting force is automatically detected and judged with the rise of the output signal. The output signal returns to zero concurrently with the completion of cutting. When the fall of the output signal is detected, the completion of cutting is automatically judged.

Figure 22:
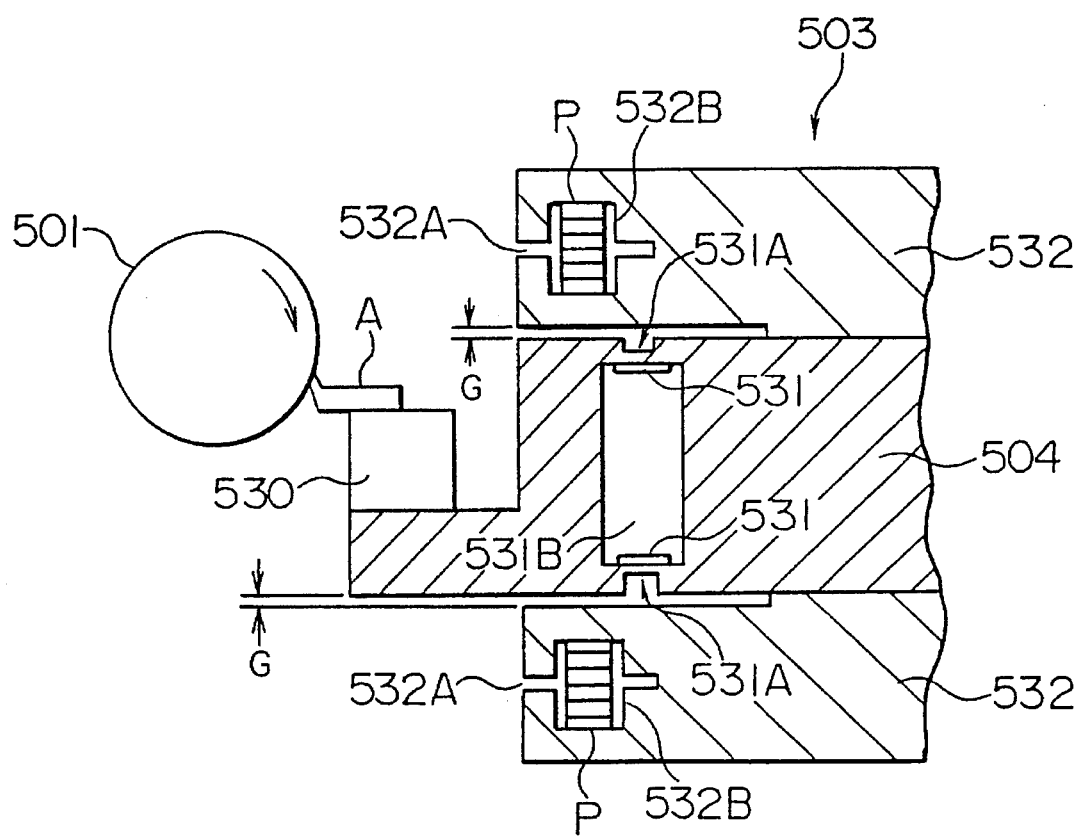
FIG. 22 is a view showing the detail of structure of a cutting tool rest.

FIG. 22 is a view showing the detail of structure of the tool rest 503. Cutting tool A is provided to the force sensor 04 through a mount 530. The force sensor 504 is fixed to the tool rest 503.

The force sensor 504 is structured in the following manner: a square hole 531B penetrates the middle portion of square grooves 531A formed on the upper and lower surface; and strain gauges 531 are stuck on the upper and lower surfaces of the square hole 531B corresponding to the square groove 531A.

The force sensor 504 detects the cutting force of cutting tool A which is generated when the photoreceptor drum body 501 is machined. The detection is conducted in the form of detecting the tensile or compressive strain acted on the upper or lower surface of the square hole 531B, and the detected cutting force is outputted as the aforementioned signal waveform.

A small gap G is formed between the upper and lower sides of the force sensor 504 and restricting members 532. In this case, the bottom portion of each restricting member 532 is fixed to the force sensor 504 in such a manner that the bottom portion is brought into contact with the force sensor 504.

In each restricting member of the cutting apparatus of the present invention, a piezoelectric element P is provided inside each square hole 532B which is connected with a groove 532A. When a voltage impressed upon piezoelectric element P is varied, gap G is finely adjusted.

Accordingly, a static load is previously given to the cutting tool while the output of the force sensor 504 is being detected, and then the load to be given to the sensor is gradually increased.

Gap G is set so that the force sensor 504 can not be deformed exceeding a predetermined value within a limit (for example, the predetermined value is set to be 50% to 70% of a critical strain). Even when a load given to the cutting tool is increased by adjusting a voltage impressed upon piezoelectric element P, deformation of the tool rest 531 is restricted by the restricting member 532 so that the output from the force sensor 504 is not increased more than a predetermined value.

When the cutting condition is normal and cutting force of cutting tool A is in a predetermined range, elastic deformation of the force sensor 504 is restricted in the range of gap G. Therefore, cutting is continuously conducted while the force sensor 504 is not brought into contact with each restricting member 532.

In the case of an abnormal cutting condition or an accident, the cutting force given to the cutting tool exceeds a predetermined range, so that a strong force is given to the force sensor 504. In the aforementioned case, the force sensor 504 is deformed and gap G becomes zero, so that the force sensor 504 is brought into contact with the restricting member 532. As a result, the deformation of the force sensor 504 is restricted by the restricting member 532. Accordingly, the force sensor 504 is not deformed exceeding a predetermined value, so that the damage of the force sensor can be prevented.

The aforementioned example shows a mechanism to prevent the damage of the force sensor 504 in the direction of a principal force. With regard to the directions of feed force and radial force, the damage of the force sensor 504 can be easily prevented in the same manner.

In the case of a force sensor in which a strain gauge is utilized, the damage of the sensor can be easily prevented when the present invention is applied.

According to the present invention, a force sensor integrally incorporated into a cutting tool can be prevented from a damage caused by an abnormal cutting condition or an unanticipated accident. As a result, a cutting apparatus can be provided in which a cutting force is accurately detected so that a mirror surface can be always obtained.

What is claimed is:

1. A cutting apparatus for finishing a surface of a workpiece, said workpiece comprising a metallic material to be used as a substrate of a photoreceptor in an image forming apparatus, said cutting apparatus comprising;

a cutting tool;

a detector contacting said cutting tool, for directly detecting a cutting force exerted on said cutting tool by said workpiece, and generating a force signal responsive to said cutting force;

a memory for storing a plurality of mode pattern data, said mode pattern data including a plurality of mode patterns, each expressing one of a plurality of types of defects which may occur on said surface of said workpiece; wherein said mode pattern data includes a plurality of limit values;

a determinator for determining a start time and an end time of a cutting of said workpiece with said cutting tool, according to said cutting force;

a comparator for performing a comparative analysis on said force signal and said mode pattern data by counting a number of times said force signal exceeds at least one of said plurality of limit values in a time period between said start time and said end time determined by said determinator; and judging device for determining the type of defect on said surface of said workpiece during finishing, based on results of said comparative analysis.

2. The apparatus of claim 1 wherein said comparator performs said comparative analysis on said force signal and said mode pattern data periodically.

3. The apparatus of claim 1, wherein the mode pattern data are obtained from an analysis of the force signals generated in trial cutting processes performed in advance of finishing the surface.

4. The apparatus of claim 1, wherein the mode pattern data include reference data to distinguish an abnormal state of the detector means from a normal state thereof; and the judging device judges if the detector falls into the abnormal state based on the comparative analysis on the force signal and the reference data.

5. The apparatus of claim 4, wherein the reference data includes force shift data in the force signal which occurs when the apparatus stops to finish the surface; and judgment of the abnormal state in the detector is based on a comparison between the force shift data and the force signal.

6. The apparatus of claim 1, further comprising:

a drive means for adjusting setting angles of the cutting tool in a tool setting step; and control means for setting the cutting tool to appropriate setting angles by controlling the driving so as to minimize a fluctuation ratio, the fluctuation ratio being a ratio of fluctuation of the force signal divided by an average of the same force signal.

7. The apparatus of claim 1, wherein the mode pattern data including reference data corresponding to an abnormal state in lubricating a tip of the cutting tool; and the judging device finds an occurrence of abnormal state in the lubrication based on a comparative analysis of the force signal and the reference data.

8. The apparatus of claim 7, further comprising a lubricator for controlling the lubrication, which responds to the finding of the occurrence of the abnormal state by the judging device.

9. The apparatus of claim 1, wherein the mode pattern data includes reference data which corresponds to an abnormal state in chip collection from the workpiece, the abnormal state in the chip collection including a chip packing and chip entanglement; and the judging device judges an occurrence of the abnormal state in the chip collection.

10. The apparatus of claim 9, further comprising a lubricator for controlling lubrication of the tip of the cutting tool responsive to the judgment by the judging device.

11. The apparatus of claim 9, further comprising a collector for controlling collection of the chips from the workpiece responsive to the judgment by the judging device.

12. The apparatus of claim 1 wherein said mode pattern data include mode patterns corresponding to:
    (a) a rough workpiece surface caused by vibration,
    (b) a rough workpiece surface caused by scratches,
    (c) a rubbed surface workpiece surface caused by cutting chips, and
    (d) a surface of said workpiece with an uncut portion.

13. A cutting method for finishing a surface of a workpiece, said workpiece comprising a metallic material to be used as a substrate of a photoreceptor in an image forming apparatus, said cutting method comprising:
    storing a plurality of mode pattern data, said mode pattern data including a plurality of mode patterns, each of which expresses one of a plurality of types of defects which may occur on a surface of said workpiece;
    cutting said workpiece with a cutting tool;
    detecting a cutting force exerted on said cutting tool by said workpiece with a detector means directly contacting said cutting tool;
    generating a force signal responsive to said cutting force and changes thereof for a predetermined period of time;
    determining a start time and an end time of cutting said workpiece with said cutting tool according to said cutting force; performing a comparative analysis on said force signal and said mode pattern data during the time between the determined start time and the determined end time; and
    determining the type of defect on said surface of said workpiece during finishing, based on results of said comparative analysis.

14. The cutting method of claim 13 further comprising;
    controlling said cutting tool based on results of said comparative analysis.

15. The cutting method of claim 13 wherein said mode pattern data is obtained by;
    detection of a cutting force exerted on said cutting tool by said workpiece; generation of a force signal responsive to a change in said cutting force for a predetermined period of time;
    determination of a maximum peak value of said cutting force;
    repeating said detection, said generation and said determination to obtain a plurality of maximum peak values of said cutting force;
    obtaining an average value and a standard deviation value of said plurality of maximum peak values, and
    obtaining a plurality of limit values according to said average value and said standard deviation value of said plurality of maximum peak values.

16. The cutting method of claim 15 wherein said comparative analysis includes:
    counting a number of times a value of said force signal exceeds at least one of said plurality of limit values between said start time and said end time.

17. The cutting method of claim 14 comprising counting periodically a number of times a value of said force signal exceeds at least one of a plurality of limit values between said start time and said end time.

18. The cutting method of claim 15 comprising obtaining said average value and said standard deviation value from said plurality of maximum peak values excluding a highest value and a lowest value of said plurality of maximum peak values.

\* \* \* \* \*